(12) United States Patent
Nakano et al.

(10) Patent No.: US 9,329,373 B2
(45) Date of Patent: May 3, 2016

(54) CATADIOPTRIC OPTICAL SYSTEM WITH MULTI-REFLECTION ELEMENT FOR HIGH NUMERICAL APERTURE IMAGING

(71) Applicants: CANON KABUSHIKI KAISHA, Tokyo (JP); The Arizona Board of Regents on behalf of the University of Arizona, Tucson, AZ (US)

(72) Inventors: Masatsugu Nakano, Tucson, AZ (US); Jose Manuel Sasian-Alvarado, Tucson, AZ (US); Tamer T. Elazhary, Tucson, AZ (US)

(73) Assignees: Canon Kabushiki Kaisha, Tokyo (JP); The Arizona Board of Regents on Behalf of the University of Arizona, Tuscon, AZ (US)

( * ) Notice: Subject to any disclaimer, the term of this patent is extended or adjusted under 35 U.S.C. 154(b) by 163 days.

(21) Appl. No.: 13/766,442

(22) Filed: Feb. 13, 2013

(65) Prior Publication Data

US 2014/0226203 A1    Aug. 14, 2014

(51) Int. Cl.
*G02B 17/08* (2006.01)
*G02B 21/04* (2006.01)

(52) U.S. Cl.
CPC .......... *G02B 17/084* (2013.01); *G02B 17/0856* (2013.01); *G02B 21/04* (2013.01)

(58) Field of Classification Search
CPC ... G02B 17/084; G02B 21/04; G02B 17/0856
USPC ......... 359/362–366, 838, 850, 857–859, 861, 359/868, 869
See application file for complete search history.

(56) References Cited

U.S. PATENT DOCUMENTS

| | | | |
|---|---|---|---|
| 4,863,253 A | 9/1989 | Shafer et al. | |
| 5,650,877 A | 7/1997 | Phillips, Jr. et al. | |
| 5,793,538 A | 8/1998 | Cameron et al. | |
| 6,064,517 A * | 5/2000 | Chuang et al. | 359/364 |
| 6,600,608 B1 | 7/2003 | Shafer et al. | |

(Continued)

FOREIGN PATENT DOCUMENTS

| | | |
|---|---|---|
| WO | 2008/101676 A2 | 8/2008 |
| WO | 2009/046137 A1 | 4/2009 |

OTHER PUBLICATIONS

Shafer, D. "Wide-Angle Flat-Image Unobscured Telescope with Four Spherical Mirrors",David Shafer Optical Design, Inc., Fairfield, Conn., 6 pages.

(Continued)

*Primary Examiner* — Stephone B Allen
*Assistant Examiner* — Ryan Dunning
(74) *Attorney, Agent, or Firm* — Canon USA Inc. IP Division

(57) ABSTRACT

A catadioptric system includes a first catadioptric group, a second catadioptric group, and a lens group disposed in axial alignment with each other. The first catadioptric group includes a solid lens having an input surface, a primary reflective surface, secondary reflective surface and an exit surface. The primary reflective surface is a curved surface concave towards the secondary reflective surface. A light flux entering through the input surface undergoes more than two reflections between the primary and secondary reflective surfaces, prior to exiting through the exit surface. At least one of the primary reflective surface and secondary reflective surface has a continuous and smooth topological profile.

1 Claim, 14 Drawing Sheets

(56) References Cited

U.S. PATENT DOCUMENTS

| | | |
|---|---|---|
| 7,646,533 B2 | 1/2010 | Chuang et al. |
| 7,884,998 B2 | 2/2011 | Armstrong |
| 7,898,749 B2 | 3/2011 | Ford et al. |
| 2002/0075785 A1 | 6/2002 | Lee et al. |
| 2006/0158720 A1* | 7/2006 | Chuang et al. ............... 359/364 |
| 2008/0247036 A1* | 10/2008 | Armstrong ................... 359/365 |
| 2010/0188738 A1* | 7/2010 | Epple et al. .................. 359/365 |
| 2010/0309566 A1* | 12/2010 | DeWitt et al. ................ 359/729 |
| 2012/0050890 A1* | 3/2012 | Kadkly ......................... 359/729 |

OTHER PUBLICATIONS

Grey, D.S., et al., "A New Series of Microscope Objective: I. Catadioptric Newtonian Systems," Journal of the Optical Society of America, Sep. 1949, pp. 719-723, vol. 39, No. 9.

* cited by examiner

IMAGE-SIDE SURFACE 102b OF ELEMENT 102

OBJECT-SIDE SURFACE 102a OF ELEMENT 102

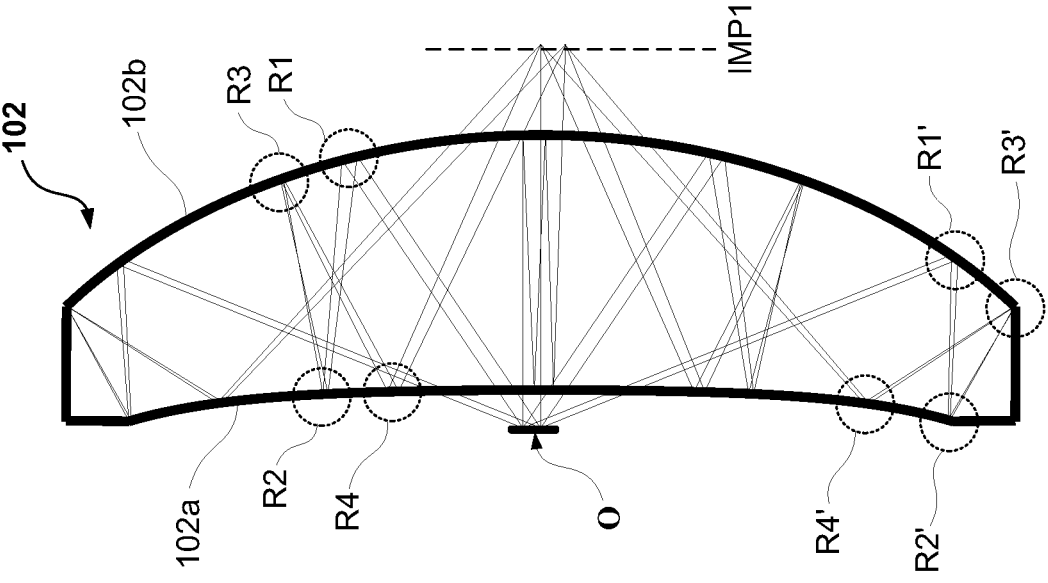
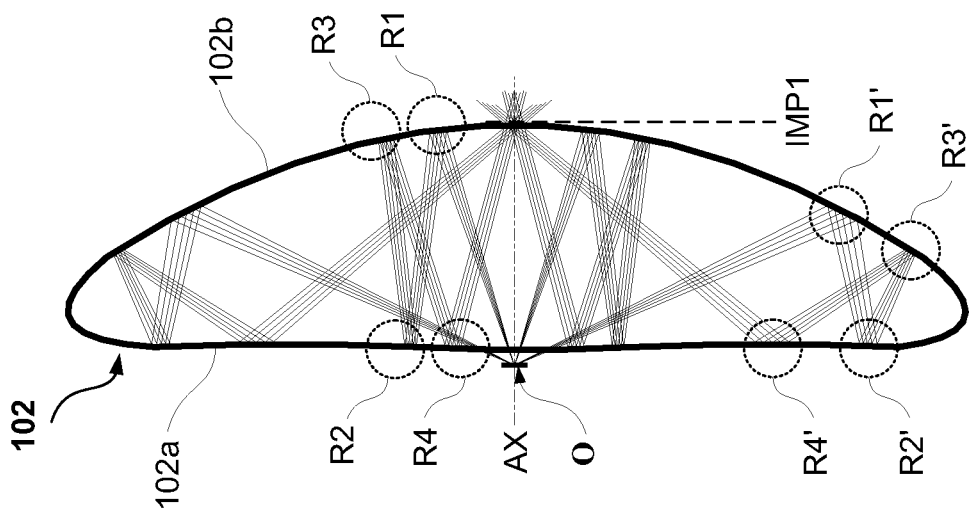

FIG. 4A  FIG. 4B  FIG. 4C
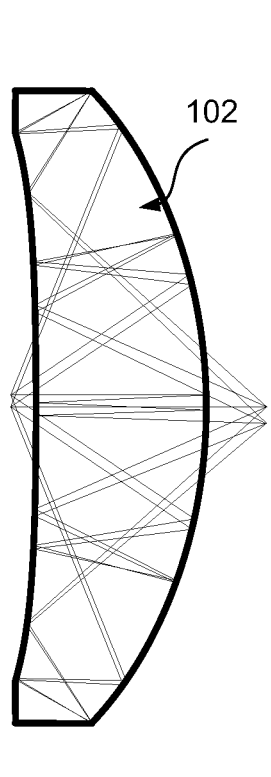
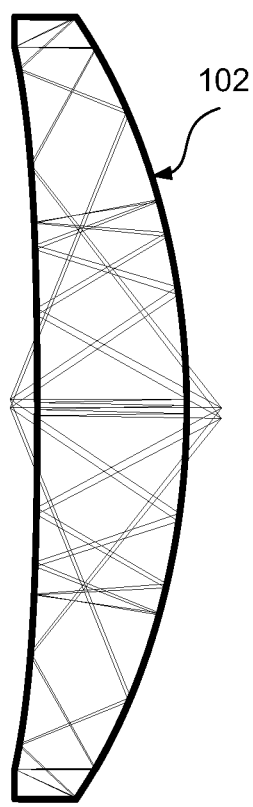
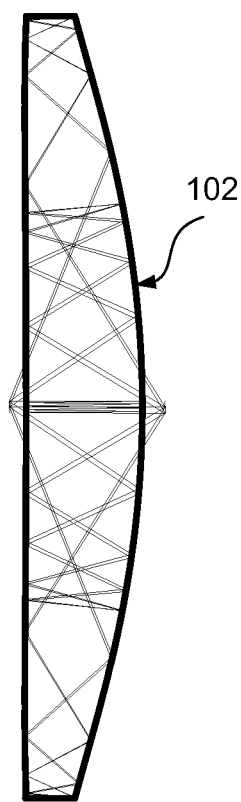
4 REFLECTIONS          6 REFLECTIONS          8 REFLECTIONS
FIG. 4D
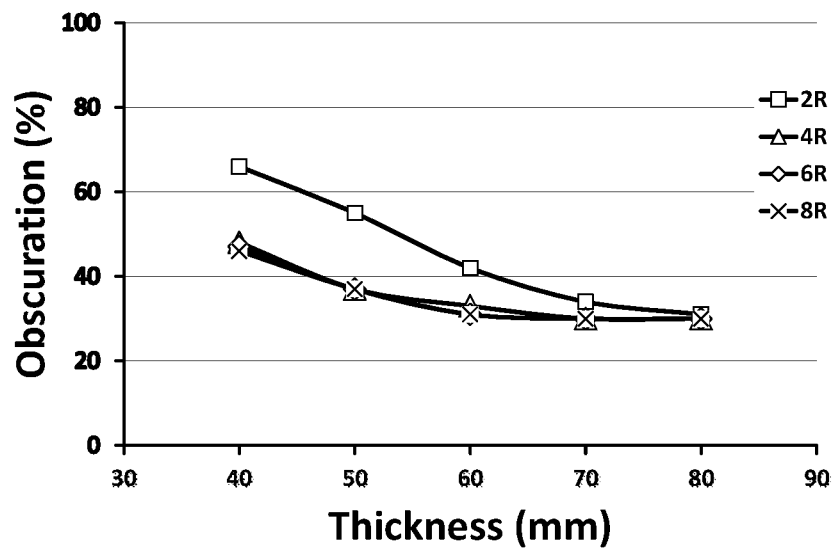

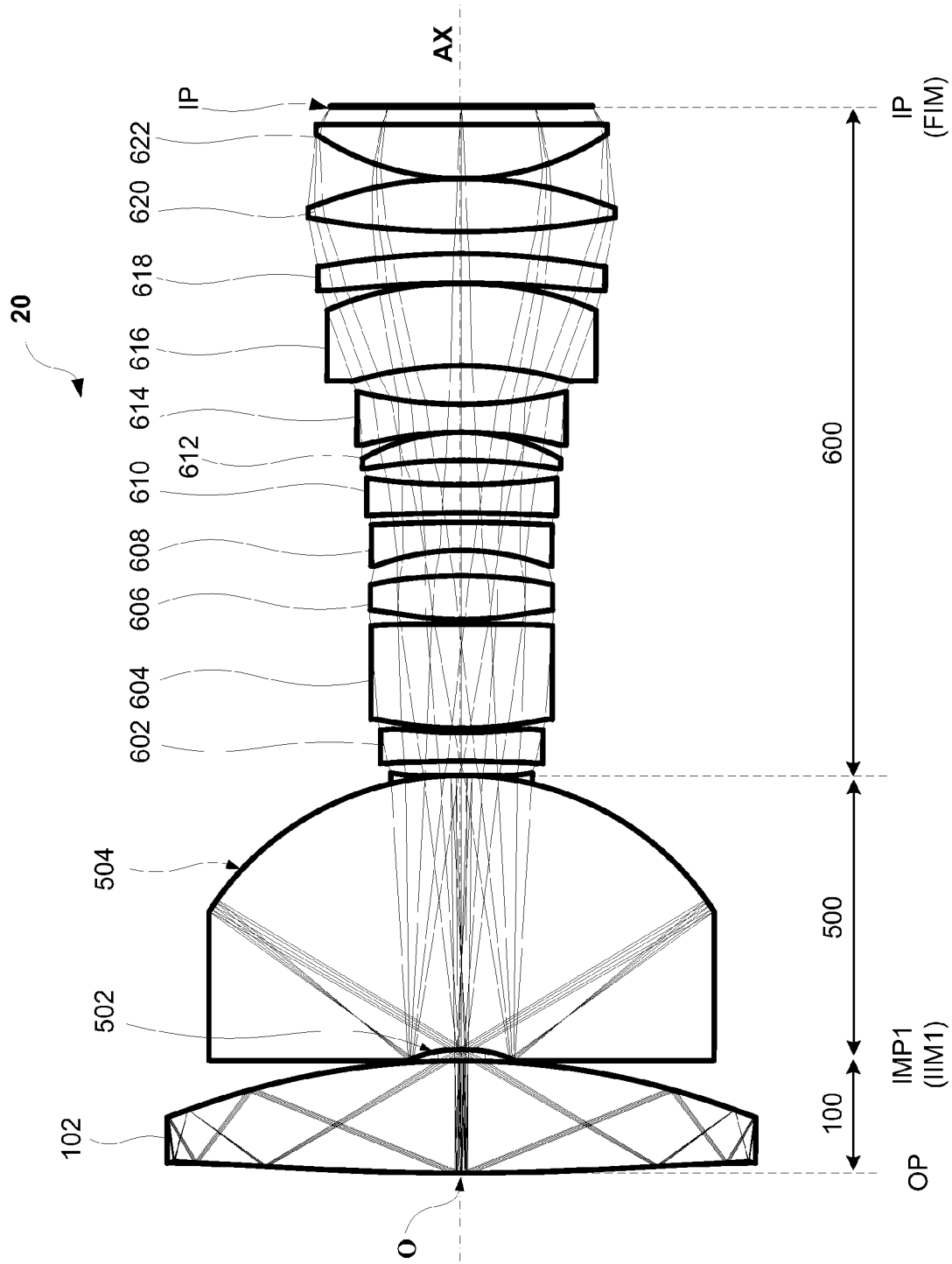

CATADIOPTRIC PARAMETERS

$$R_1 = \frac{2t_1 k_o (t_o + t_1)}{t_o(1-k_o) - 2k_o t_1}$$

$$R_2 = \frac{2(t_1 + t_2)}{1 - \frac{k_o}{t_o}(t_1 + t_2)(\phi_1(t_o + t_1) - 1)}$$

*Where*

$$t_o = \frac{k_o L_o}{1 - M_o} \qquad k_o = \frac{\theta_{ap}}{\theta_m}$$

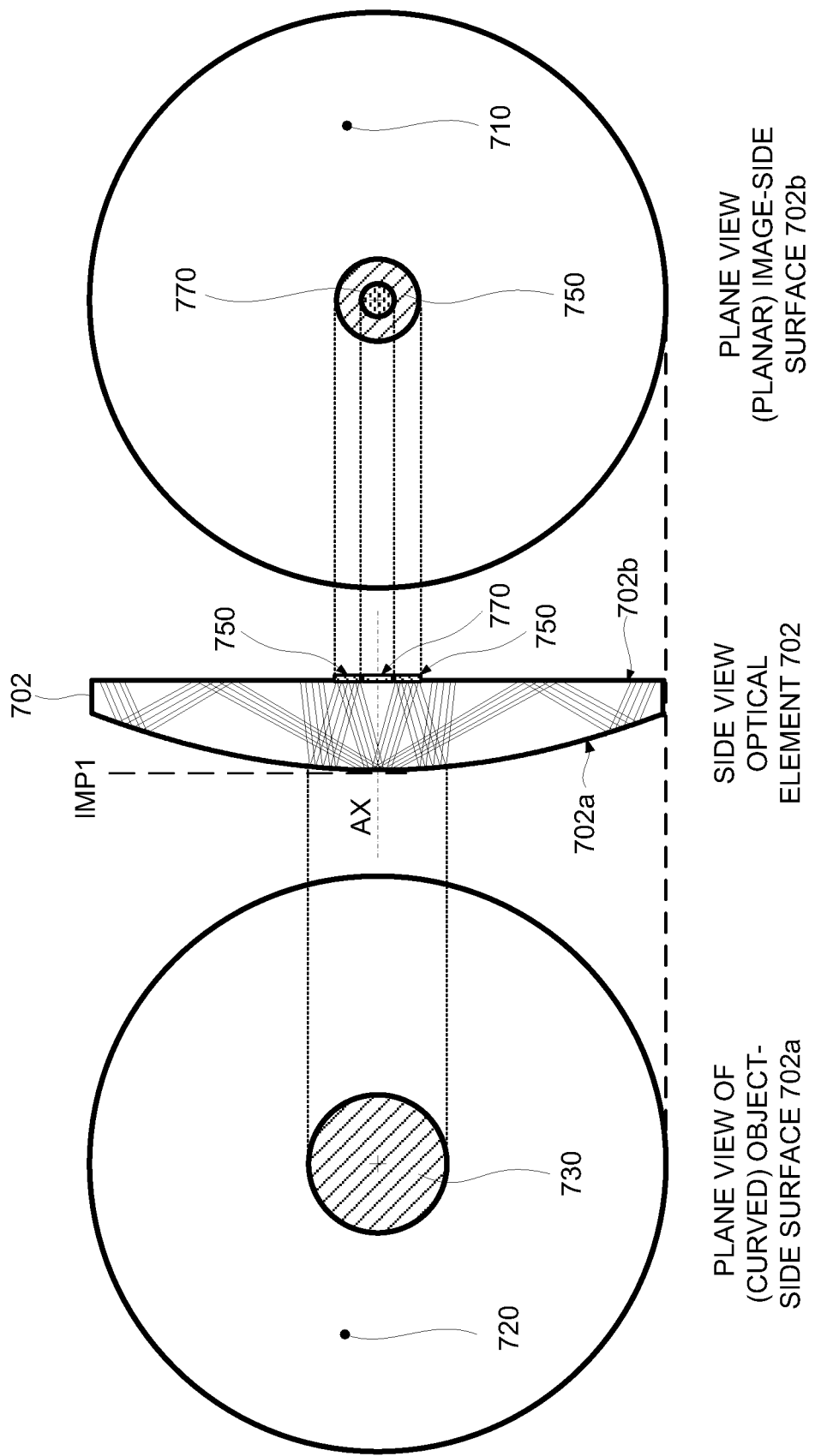

CATADIOPTRIC OPTICAL SYSTEM WITH MULTI-REFLECTION ELEMENT FOR HIGH NUMERICAL APERTURE IMAGING

BACKGROUND OF THE INVENTION

1. Field of the Invention

The present invention is related generally to optical imaging, and more particularly it is related to a catadioptric optical system with a multi-reflection optical element for high numerical aperture imaging. The catadioptric optical system may find industrial application in microscope objective systems, lithographic projection systems or telescopic systems, among others.

2. Description of the Related Art

Imaging apparatuses, such as microscope objectives, lithographic projection systems, or even telescopes, use purely reflective (catoptric), purely refractive (dioptric), or a combination of reflective and refractive (catadioptric) optical elements to form an image of an object. Conventional optical systems used in these instruments often lack compactness due to the number of optical elements necessary to correct aberrations and produce good image quality.

Four main design approaches have been adopted in the design of conventional optical systems, as follows, Total Internal Reflection (TIR), dioptric, catoptric, and catadioptric. In the TIR approach, obscuration is the main limiting factor which cannot be reduced beyond a certain limit. All refractive (dioptric) optical systems are the default standard for optical systems in the visible wavelength ranges with low numerical aperture (NA). However, as NA increases, correction of chromatic aberrations requires an ever increasing number of optical elements, which results in the total length (dimension in the direction of incident light) of the optical system being relatively larger than in the other approaches. The catoptric approach, which uses all reflective elements, is characterized by negligible chromatic aberrations controlled by appropriately designed mirror coatings, but central obscuration and Petzval curvature are relatively large. The catadioptric approach is a compromise between the all reflective (catoptric) and all reflective (dioptric) approaches. Although a catadioptric optical system allows for better control of aberrations and obscuration ratio, chromatic aberrations induced by individual lenses and Petzval curvature induced by multiple mirrors are appreciable and contribute significantly to quality degradation in the final image.

Certain catadioptric designs have managed to balance certain aberrations and scale down the overall length of the optical system by reducing the number of optical elements included therein. For example, U.S. Pat. No. 5,650,877, international publication number WO2008/101676 (herein "WO2008/101676"), FIG. 8 of U.S. Pat. No. 7,646,533, and the article "A New Series of Microscope Objective: I. Catadioptric Newtonian Systems," JOSA 39, No 9, 719-723 (1949), by Grey et al. have a common feature in that the first optical element is a solid lens in which light is reflected two times within it. In this manner, the extra space and aberrations of at least one reflective element and one refractive element is avoided. However, high obscuration ratios and limited numerical aperture are pervasive in these arrangements.

In addition, it has been proposed that the first optical element can be made to reflect light more than two times within it. For example, U.S. Pat. No. 7,898,749 to Ford et al., (herein "Ford") discloses a multiple reflective lens having multiple, substantially-annular and concentric, reflective zones of appropriate directionality, where the zones are illuminated in sequence by a light flux incident on the outer edge of the lens.

According to Ford, the above-mentioned lens can be fabricated in a variety of manners, but preferably by way of diamond machining. Two surfaces may be formed as the two sides of a single solid element (a solid lens), or two lenses having the multiple reflective zones are designed as two mechanically separate elements on each side of an air gap (a hollow lens). Depending upon the design of the lens, focusing with the multiple reflective lens can be accomplished by moving the lens relative to the image plane, as in conventional lenses, or by adjusting the gap between the two reflective surfaces.

One of the problems encountered with the multiple reflection lens proposed by Ford is that fabrication becomes excessively costly and complicated. For example, since the substantially-annular and concentric reflective zones must have appropriate directionality so that the zones are illuminated in sequence by incident light rays, fabrication precision must be very high. In addition, since the concentric reflective zones must have appropriate directionality so that the zones are illuminated in sequence by incident light, the angle of incident light must be restricted to only those angles that match the appropriate directionality of the reflective zones. Moreover, when incident light with steep incident angles is used, a large obscuration ratio and limited field of view may be observed. In other words, the lens with multiple concentric zones having predetermined directionality would lead to an optical lens design with tight fabrication tolerances, large obscuration ratios, limited field of view, and low numerical aperture.

David Shafer (herein "Shafer"), in an article entitled "Wide-Angle Flat-Image Unobscured Telescope with Four Spherical Mirror", Journal of the Optical Society of America, Vol. 73, No. 12, published 1983, describes that multiple reflections (more than two) may be useful to correct for spherical aberration, coma and astigmatism, but it substantially more obscuration than a two-reflection design unless off-axis illumination is adopted. The design proposed by Ford is similar to that of Shafer in that light is incident off-axis and in that multiple reflective zones not forming a single surface are used to achieve four reflections.

Accordingly, there is a need for optical systems that can provide minimum obscuration, correction of chromatic aberration and Petzval curvature, and allow for appropriate alignment without undue difficulty. That is, it is particularly desirable an easy-to-fabricate multi reflection optical element that can provide appropriate correction of aberration, small obscuration ratio, large field of view, and small RMS wavefront errors in a broad spectral band.

SUMMARY OF THE INVENTION

According to an aspect of the present invention, a catadioptric system includes a first catadioptric group, a second catadioptric group, and a lens group disposed in axial alignment with each other. The first catadioptric group includes a solid lens having an input surface, a primary reflective surface, secondary reflective surface and an exit surface. The primary reflective surface is a curved surface concave towards the secondary reflective surface. A light flux entering through the input surface undergoes more than two reflections between the primary and secondary reflective surfaces, prior to exiting through the exit surface. At least one of the primary reflective surface and secondary reflective surface has a continuous and smooth topological profile.

Advantageously, exemplary embodiments of the present invention address issues related to obscuration, correction of chromatic aberration and Petzval curvature, and allow for appropriate alignment without undue difficulty.

Further features of the present invention will become apparent from the following description of exemplary embodiments with reference to the attached drawings.

BRIEF DESCRIPTION OF THE DRAWINGS

FIGS. 3A and 3B illustrate light flux propagation within the multi-reflection optical element, in accordance with certain embodiments of the present invention.

FIGS. 4A, 4B and 4C illustrate various examples of the multi-reflection optical element where a light flux is reflected 4, 6 and 8 times, respectively, in accordance with certain embodiments of the present invention. FIG. 4D is a graph of obscuration ratio as a function of axial thickness of the optical element for 2, 4, 6 and 8 reflections within the multi-reflection optical element.

FIG. 6 illustrates a catadioptric optical system including a multi-reflection optical element, and having one intermediate image, in accordance with an embodiment of the present invention.

FIG. 11 illustrates a side view and two plane views of the catadioptric optical element shown in FIG. 10.

DESCRIPTION OF THE EMBODIMENTS

Embodiments according to the present invention will be described below with reference to the attached drawings. In the various drawings discussed below, the left side of each optical element will be referred to as the front or object-side, whereas the opposite side thereof (right side) will be referred to as the back or image side. Therefore, as used herein, the side of an optical element (lens or mirror) where the object to be imaged is placed is interchangeably referred to as the "object-plane side", "object side", or "front side" of the optical element; and the side of optical element where the image is formed is interchangeably referred to as the "image-plane side", "image side" or "back side" of the optical element. The "thickness" of an optical element is generally considered as the axial distance between the object-side surface and the image-side surface of the optical element. The term "optical element", as used in this application, should be generally understood as lens either made of a single piece of solid optically transparent material, or made of plural pieces of solid optically transparent material cemented together to form a single element.

Figure 1:
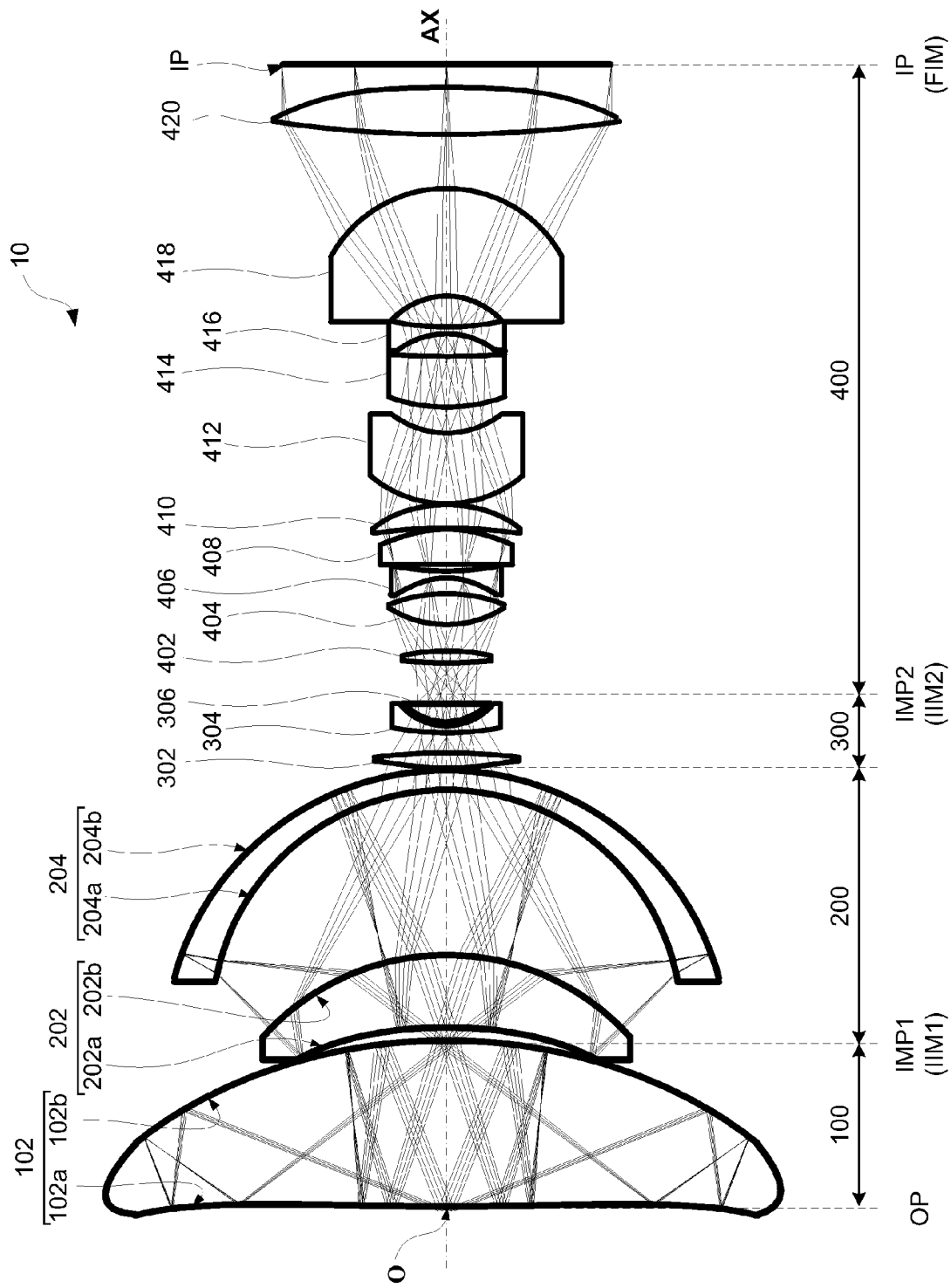
FIG. 1 illustrates a catadioptric optical system including a multi-reflection optical element, and having two intermediate images, in accordance with an embodiment of the present invention.

As illustrated in FIG. 1, according to an exemplary embodiment of the present invention, a catadioptric system 10 includes a first catadioptric group 100, a second catadioptric group 200, a field lens group 300 and a dioptric group 400 disposed along an optical axis AX, in order from an object plane OP to an image plane IP. Preferably, each of the first catadioptric group 100, second catadioptric group 200, field lens group 300, and dioptric group 400 is arranged in axial alignment with each other. In operation, the catadioptric group 100 is configured to collect a light flux from an object scene (an object O located at an object plane OP), reflect the light flux more than two times within reflective surfaces therein, and focus the collected light onto an intermediate image plane (IMP1) to from a first intermediate image (IIM1). The catadioptric group 200 is configured to collect the light flux from the intermediate image plane IMP1, and reflect the light flux at least two times. The field lens group 300 receives the light flux exiting from the catadioptric group 200, and focuses the light flux onto a second intermediate image plane (IMP2) to from a second intermediate image (IIM2). The dioptric group 400 is configured to magnify the second intermediate image IIM2, and form a final image (FIM) at an image plane IP.

The catadioptric group 100 consists of a single multi-reflection optical element (MRE) 102 (also referred to as a "solid lens") having an object-side surface 102a on its object-side thereof, and an image-side surface 102b on its image-side thereof. Notably, the multi-reflection optical element 102 is configured to reflect incident light more than two times within it. More specifically, when a light flux is incident on the multi-reflection optical element 102, the image-side surface 102b is configured to repeatedly reflect a light flux towards the object-side surface 102a, and the object-side surface is configured to repeatedly reflect the light flux towards the image-side surface. The shapes of the object-side surface and the image-side surface are designed so that the incident light flux is first progressively reflected between the two surfaces in a divergent manner away from the optical axis, and then progressively reflected in a convergent manner towards a focus plane along the optical axis. Accordingly, the catadioptric group 100 effectively works as a group of reflective surfaces separated by a refractive body. Therefore, for ease of description, the catadioptric group 100 is also referred to as a "first catadioptric group"; and the optical element 102 is also referred to as "solid lens 102", a catadioptric lens, or it may also be referred to as MRE 102. All such references are to be considered equivalent.

The catadioptric group 200 (second catadioptric group) is disposed in axial alignment with the catadioptric group 100 (first catadioptric group). In the embodiment illustrated in FIG. 1, the catadioptric group 200 includes of a first Mangin mirror 202 having an object-side surface 202a and an image-side surface 202b, and a second Mangin mirror 204 having an object-side surface 204a and an image-side surface 204b. In other embodiments, it is sufficient that the catadioptric group 200 includes a concave reflective surface (primary mirror) and a convex reflective surface (secondary mirror) opposite to each other, and configured to guide the light flux from the first catadioptric group 100 towards an image plane. In other words, as understood by persons of ordinary skill in the art, the catadioptric group 200 may be implemented with specular reflective mirrors rather than solid lenses having reflective surfaces. Details of the implementation of catadioptric parameters are described below with reference to FIG. 7.

The field lens group 300, which is disposed in axial alignment with the catadioptric group 200, includes a first lens 302, a second lens 304 and a third lens 306. The field lens group 300 may include less or more than 3 lenses, as appropriate. The dioptric optical group 400 includes a plurality of lenses (refractive elements) 402, 404, 406, 408, 410, 412, 414, 416, 418 and 420 arranged in this order along the optical axis AX, and preferably in axial alignment with the field lens group 300. In the present embodiment (FIG. 1), the field lens group 300 and dioptric group 400 are shown and referred to as two separate groups. However, these two groups may be generally referred to as lens group as whole.

In operation, the optical element 102 of the catadioptric group 100 collects from the object O a light flux to form a first intermediate image IIM1 at a first intermediate image plane IMP1. It should be noted that in the present embodiment, the first intermediate image IIM1 may be formed within the body of the optical element 102, at the apex of the image-side surface 102b, or at the image-side (outside) of the optical element 102. The catadioptric group 200 is disposed at a position where the first intermediate image IIM1 is formed, or immediately thereafter. In this manner, the catadioptric group 200 is configured to collect the light flux passing through the catadioptric group 100, and to form a second intermediate image IIM2, at a second intermediate image plane IMP2. To that end, the field lens group 300 receives the light flux from the catadioptric group 200, and focuses the collected light flux onto the second intermediate image plane IMP2. The dioptric group 400 is configured to magnify the second intermediate image IIM2, and to project the light flux onto a final imaging plane IP to form a final (resultant) image FIM. The catadioptric optical system 10 can also operate in a reverse optical path where the object plane OP and image plane IP are interchanged, as in the case of a lithographic projection system.

The terms "first", "second", "third", etc., as used herein, denote a relative position of the optical element or groups thereof; and this relative position is defined by the order in which each optical component is spatially arranged between the object plane OP to the image plane IP. The image plane IP corresponds to an imaging surface of a solid-state imaging sensor (photoelectric conversion element), such as a CCD sensor or a CMOS sensor, when an image pickup apparatus is used to detect the image of the object O. In addition, the image plane IP may correspond to a film surface when a photographic optical system of a silver-halide film camera, attached to the image pickup apparatus, is used to detect the image of the object O.

The structure and function of the catadioptric group 100 will be explained in detail, by referring to FIGS. 1, 2A-2C and 3A-3B. As discussed above, in one exemplary embodiment, the catadioptric group 100 consists of the multi-reflection optical element 102, which is a single solid lens having a flattened substantially circular body and defining an object-side surface and an image-side surface on opposite sides thereof. In other embodiments, the multiple reflection optical element 102 may be implemented differently. For example, the multi-reflection optical element 102 may have a notably convex shape on one side and a flattened shape on the opposite side, but can still maintain substantially circular body and define an object-side surface and an image-side surface on opposite sides thereof.

As illustrated in FIG. 1, the optical element 102 includes an object-side surface 102a and an image-side surface 102b respectively on the object side and image side thereof. In operation, the object-side surface 102a and image-side surface 102b serve to confine an incident light flux within the two surfaces such that the light flux undergoes more than two reflections within the interior of optical element 102.

Figure 2C:
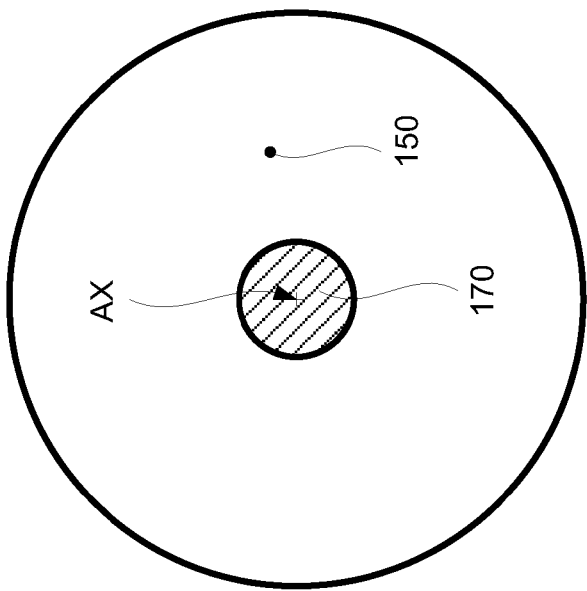
FIGS. 2A, 2B and 2C illustrate different views of an example of how the multi-reflection optical element may be implemented, in accordance with an embodiment of the present invention.
Figure 2B:
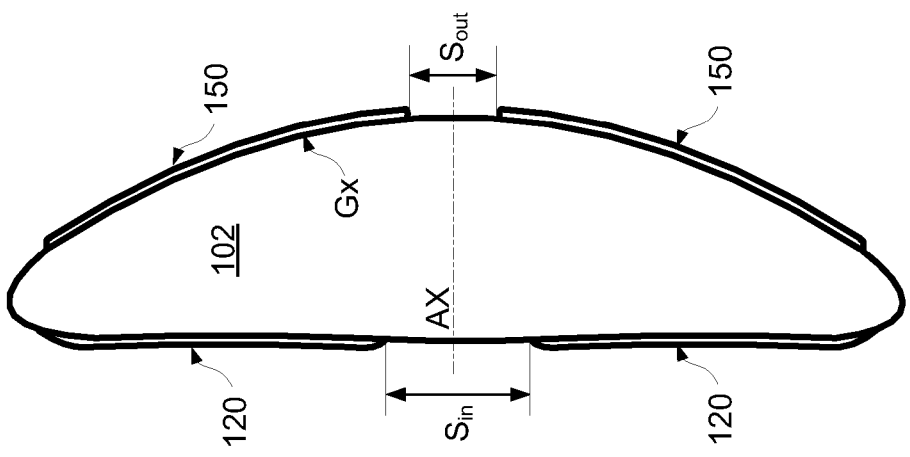
Figure 2A:
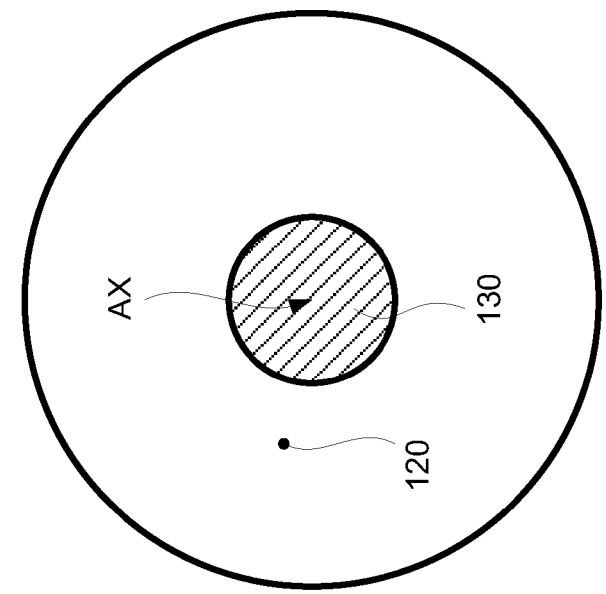

As illustrated in FIG. 2A, in some embodiments, the object-side surface 102a may be substantially flat or planar (non-curved) surface. The image-side surface 102b, on the other hand, is preferably a continuous curved surface, concave towards the object-side surface. The image-side surface 102b can have either a spherical or aspherical shape. More specifically, as shown in the embodiment illustrated in FIG. 1, when seen in the direction of light incidence, the object-side surface 102a is substantially flat in the center thereof, and slightly curved (convex) towards the image-side in the outer edges. This particular shape may be advantageous when the optical element 102 is designed to work with an immersion fluid on the object-side (in the object space) thereof.

In the present embodiment, therefore, the optical element 102 is a single solid lens shaped as a plano-convex lens. However, the optical element 102 is not limited to a solid single lens per se. Instead, the optical element 102 may also be implemented by a combination of a solid lens and one or more mirrors, or it can be implemented by a combination of cemented lenses with appropriate reflective surfaces therein. Notably, the use of a mirror and lens combination may have negative effects on image quality, but the goal of generating more than two reflections within the catadioptric group may nevertheless be achieved. In addition, instead of a plano-convex lens, the optical element 102 may also be shaped as a biconvex lens, as a meniscus lens having spheric or aspheric surfaces, or in any other appropriate shape having at least one curved reflective surface with a continuous and smooth profile capable of producing more than two light reflections within the optical element 102.

More specifically, the optical element 102 includes at least one curved reflective surface which is symmetric to its axis AX, and has a continuous and smooth topological profile. In other words, at least one of the image-side surface or the object-side surface of the optical element 102 includes a curved reflective surface based on a surface of revolution defining a continuous curve from the edge of the optical element to a central region thereof surrounding the optical axis. As shown in FIG. 2B, the generatrix Gx of such reflective surface may comprise a continuously curved line extending from the optical axis to the edge of the optical element 102. One possible form of the curved surface may be defined by the rotation of an un-interrupted line that defines an aspherical, spherical or conical surface centered on the optical axis AX. It is advantageous if the image-side surface 102b of optical element 102 is an axisymmetric curved surface with a continuous and smooth topological profile for ease of fabrication.

If necessary and convenient, the object-side surface 102a may also be shaped in a similar manner. Indeed, both the object-side surface 102a and the image-side surface 102b of the optical element 102 may be curved and have a continuous and smooth topological profile; an example is shown in FIG. 3B. At least in certain embodiments, however, the radius of curvature the object-side surface 102a must be different than the radius of curvature of the image-side surface 102b to provide an appropriate reflection path for an incident light flux. For example, while one of the object-side surface and the image-side surface of the optical element 102 may be curved with a continuous and smooth topological profile, the other surface may be substantially flat or planar, as illustrated in the embodiment of FIGS. 1 and 2B.

Regardless of the curvature of the surfaces in the optical element 102, it must be noted that the surfaces of the optical element 102 shall have a continuous and smooth profile, so that fabrication of the optical element can be done in any known manner. The requirement remains, however, that the optical element 102 must be configured to confine light within the two surfaces, such that an incident light flux undergoes more than two reflections within the two surfaces. To that end, a light flux entering the optical element 102, must be reflected at least two times on one surface and at least one time on the opposing surface, before the light flux exits the optical element 102.

To fulfill the requirement of achieving more than two reflections within the optical component 102, the light flux, with a predetermined angle of incidence greater than zero with respect to the optical axis AX, may enter the optical element 102 through one side and exit through the opposite side thereof, as shown in FIG. 1. Alternatively, the light flux, with a predetermined angle of incidence with respect to the optical axis, may enter and exit the optical element 102 through the same side.

FIGS. 2A, 2B and 2C illustrate various views of an example of how the multi-reflection optical element 102 may be implemented. As illustrated in FIG. 2A, a plane view of the object-side surface 102a of the optical element 102 is shown as seen from the object side thereof. On the other hand, FIG. 2C illustrates a plane view of the image-side surface 102b of the optical element 102 as seen from the image side thereof. FIG. 2B illustrates a cross-section (side view) of the optical element 102. Specifically, as illustrated in FIG. 2B, the object-side surface 102a is represented as substantially planar, and the image-side surface 102b is curved and has a continuous smooth topological profile. The curved surface, which may have either a spherical or aspherical shape, is preferably rotationally symmetric to the optical axis AX, i.e., the optical element 102 is a solid lens that has an axisymmetric shape.

As illustrated in FIG. 2A, the object-side surface 102a includes a circular transmissive region 130 (object-side transmissive region) centered on the optical axis AX and a reflective region 120 (object-side reflective region or secondary reflective surface) in a rotationally symmetric zone around the circular transmissive region 130. The circular transmissive region 130 centered on the optical axis AX is an optically transparent (transmissive) region and serves to transmit therethrough a light flux originated at the object O disposed on the optical axis AX and located at an object plane OP (as shown in FIG. 1). The reflective region 120 of the object-side surface 102a is preferably coated with a film of highly reflective material to form what can be considered an inner (internal) mirror. That is, the reflective region 120 is an area of the object-side surface 102a in a region thereof that serves as a specularly reflective surface; and the circular transmissive region 130 is an area concentric to the optical axis AX not coated with any reflective coating. Instead, the transmissive region 130 may be coated with an anti-reflection coating (film) to increase transmission of certain wavelengths of light rays incident thereupon at predetermined incident angles. In this manner, the circular transmissive region 130 can serve as an input surface (or entrance pupil) of the optical element 102; and it can be configured to allow entry of an appropriate amount of light into the multi-reflection optical element 102.

As illustrated in FIG. 2C, the image-side surface 102b of the optical element 102 includes a central transmissive region 170 (image-side transmissive region) centered on the optical axis AX, and a reflective region 150 (image-side reflective region or primary reflective surface) in a rotationally symmetric zone around the central transmissive region 170. The central transmissive region 170 is preferably a transparent surface devoid of any reflective coatings, so that it can transmit therethrough all light incident thereupon at predetermined incidence angles. The reflective region 150 is rendered specularly reflective, for example, by coating the region between the edge of lens and the central transmissive region 170 of image-side surface 102b with highly reflective materials, or by any known process. More specifically, as illustrated in FIGS. 2B and 2C, the reflective region 150 may include almost the entire area of the image-side surface 102b, except for the central transmissive region 170. In this manner, the central transmissive region 170 also functions as an exit surface ($S_{out}$) or exit pupil; and thus, it serves to regulate the amount of light that passes through the optical element 102.

The specularly reflective film that forms the reflective region 150 or reflective region 120 can be selected, for example, from a metal film such as aluminum and silver or a multilayered film made of different reflective materials. The thickness of the reflective film may be selected, for example, between tens of nanometers and a few hundreds of micrometers. More specifically, the thickness and material of the reflective film that forms the reflective surfaces may be chosen in accordance with the wavelength of light to be used. A material of the optical element 102 can be selected, for example, from crown glass, flint glass, abnormal dispersion glass, fused silica, fluorite, etc., including equivalents and combinations thereof. Therefore, the multi-reflection optical element 102 can be considered as a solid lens made of transparent material (for example glass) shaped as a biconvex lens, and having internal specularly reflective surfaces on the object-side and image-side thereof.

An example of how a light flux propagates within the optical element 102 is discussed below, by referring to FIG.

3A. The optical element 102 illustrated in FIG. 3A shows an optical element with the same profile as the optical element shown in FIG. 2B, but FIG. 3A does not show the details of the reflective and transmissive surfaces shown in FIG. 2B. In the example illustrated in FIG. 3A, the object-side surface 102a is substantially flat or planar, and the image-side surface 102b is curved, but it is notable that both the object-side surface and the image-side surface of the optical element 102 have a continuous and smooth topological profile. In the example illustrated in FIG. 3B, the object-side surface 102a is curved convex towards the opposing surface; and the image-side surface 102b is curved concave towards the object side; but both the object-side surface and the image-side surface of the optical element 102 have a continuous and smooth topological profile. Light flux propagation is substantially similar in FIGS. 3A and 3B. Notably, in FIG. 3A, the object-side surface 102a has been illustrated as substantially flat or planar, but in reality a minimum of curvature may still be necessary at least on the reflective region thereof to achieve the required more than two reflections inside the optical element 102. Accordingly, a reflective surface with a radius of curvature beyond a certain value may be effectively considered as substantially flat or planar for purposes of shape description. However, for purposes of light reflection both surfaces can have at least a minimum of curvature as determined by predetermined conditions described in more detail below.

Continuing to refer to FIG. 3A, it is shown that light transmitted through (or reflected from) an object O enters the object-side surface 102a (first surface) of optical element 102 through the aperture entrance or input surface $S_{in}$ (shown in FIG. 2B). Upon entering through the input surface $S_{in}$, the incident light flux first impinges on the reflective surface 150 (primary reflective surface) of the image-side surface 102b, and undergoes a first reflection at a reflective region R1. From the reflective region R1, the light flux travels towards the object-side surface 102a and impinges on the reflective region 120 (secondary reflective surface) at a reflective region R2. At reflective region R2, the light flux undergoes a second reflection and again travels towards the image-side surface 102b. This time, the light flux impinges on a reflective region R3 of the reflective surface 150, and undergoes therein a third reflection. Upon undergoing a third reflection, the light flux travels a second time towards the object-side surface 102a and impinges on a reflective region R4. At the reflective region R4, the light flux undergoes a fourth reflection towards the image-side surface 102b. Since the reflective region of object-side surface 102a is configured to successively reflect light towards a focusing point along the optical axis AX, after the fourth reflection, the light flux travels through an exit surface $S_{out}$ (shown in FIG. 2B), and is then focused at a first intermediate image plane IMP1.

The light flux also propagates in a similar fashion, in other optical paths, for example, by progressively undergoing reflections at reflective regions R1', R2', R3' and R4', to then focus on the first intermediate image plane IMP1. In other words, a light flux enters the optical element 102 through an input surface $S_{in}$; and as the light flux is reflected back and forth, the light flux is progressively directed circumferentially outward towards the edge of the optical element in a divergent manner. Due to the curvature of the reflective surfaces, the light flux is subsequently progressively directed inward towards the optical axis AX in a convergent manner, so that it exits through the exit surface $S_{out}$. The back and forth reflection of the light flux can be repeated any desired number of times, depending on the shape of the reflective surfaces, the thickness and diameter of the optical element 102, the angle of incidence of the light flux, the refractive index of the optical element's material, among other parameters.

As the multiple reflections progressively occur, the shape and radius of curvature of one or both of the surfaces of the optical element 102 may determine the focusing point of the light flux (along the optical axis). Those of ordinary skill in the art will understand that, depending on the curvatures and focusing distances of the object-side surface 102a and that of the image-side surface 102b, the first intermediate plane IMP1 may be deliberately placed at the apex of the image-side surface 102b (as shown in FIG. 3A), or near the surface apex (as shown in FIG. 3B). It would be advantageous however to place the first intermediate image plane IMP1 at a position of least obscuration.

It should be noted here that the reflections occurring at each reflective region R1, R2, R3 or R4 are namely governed by well known optical theory, for example, Snell's law. According to Snell's law of reflection, when a ray of light is reflected at a specularly reflective interface, the reflective ray remains within the plane of incidence, and the angle of reflection $\theta_r$ equals the angle of incidence $\theta_i$ (i.e., $\theta_i = \theta_r$). The place of incidence includes the incident ray and the normal to the point of incidence. In the present situation, where light flux enters through the input surface Sin and is reflected by the image-side surface 102b, the angle of reflection $\theta_r$ depends primarily on the light flux's angle of incidence (marginal ray angle) and the radius of curvature at the given point. Accordingly, it is envisioned that persons having ordinary skill in the art will be able to formulate and design reflective surfaces able to accommodate any number of desired reflections based on the below described predetermined conditions.

More specifically, in order to achieve 4 reflections within the optical element 102, at least the following two conditions need to be satisfied by structural shape of the object-side and image-side surfaces at the same time.

$$-0.4 < \frac{T}{R_1} < -0.1 \quad (1)$$

$$-0.1 < \frac{T}{R_2} < 0.2 \quad (2)$$

where $R_1$ is the radius of curvature for the reflective region on the image-side surface 102b, $R_2$ is radius of curvature for the reflective region on the object-side surface 102a, and T is the axial thickness of the multi reflection optical component. More specifically, as used herein, the axial thickness T is a distance along the optical axis AX between a generatrix of the reflective surface on the image-side surface 102b and a generatrix of the reflective surface on the object-side surface 102a.

For 6 reflections, the following conditions may be satisfied:

$$-0.3 < \frac{T}{R_1} < 0 \quad (3)$$

$$-0.1 < \frac{T}{R_2} < 0.1 \quad (4)$$

For 8 reflections, the following conditions may be satisfied:

$$-0.3 < \frac{T}{R_1} < 0 \quad (5)$$

$$-0.2 < \frac{T}{R_2} < 0.1 \quad (6)$$

The ratio of axial thickness to radius of curvature $T/R_1$ and $T/R_2$ may iteratively fluctuate between the upper and lower limits of the above-listed predetermined conditions such that the number of desired reflections and a desired focusing plane is achieved. However, if at least one $T/R_1$ and $T/R_2$ is less than the lower limit, a diameter of the exit surface $S_{out}$ in FIG. 2B may need to be enlarged. This would increase obscuration in the optical system, which is undesirable. On the other hand, if at least one $T/R_1$ and $T/R_2$ is larger than the upper limit, the location of intermediate image IIM1 gets closer to the optical component or inside it; this too may be detriment to the desired level of obscuration or aberration correction. In addition, magnification of the multi reflection component becomes larger than −1, which means the intermediate image has a larger angle of marginal ray compared with numerical aperture on the object space. Setting values outside of the prescribed limits may also have a negative influence on obscuration determined on the image-side surface. Moreover, values outside of the proposed conditions (1) through (6) would cause significant difficulty with correction of aberrations.

As discussed in the Background section above, in conventional catadioptric designs, obscuration cannot be reduced beyond a certain point unless image quality is sacrificed. According to at least one exemplary embodiment of the present invention, however, the multi-reflection optical element disclosed herein serves the purpose of minimizing obscuration without sacrificing image quality.

More specifically, as it is known to persons having ordinary skill in the art, multiple reflections may minimize the total length of the optical system while significantly increasing the total focal length. However, in conventional systems, this leads to an optical system design with large obscuration ratios and augmented aberrations. According to at least one embodiment of the present invention, however, when properly constructed, the appropriate combination of catadioptric optical elements enables negative chromatic aberration to offset (cancel out) positive chromatic aberration induced by conventional lenses. Similarly, in the present invention, positive Petzval curvature cancels out negative Petzval curvature. In addition, as disclosed herein, the appropriate combination of refractive and reflective surfaces advantageously allow for reducing the obscuration ratio, and providing easy alignment of the optical system. More particularly, an appropriate number of light flux reflections within the multi-reflection optical element 102 advantageously reduces the amount of obscuration without affecting image quality.

As used herein the terms "offset" or "cancel out" are intended to denote an action to make something ineffective, to counteract, to nullify, to compensate to counterbalance, to offset an error or defect or undesired effect. Accordingly, in the specification and claims, a first value can be considered "canceled out" by a second value, when the first value is made substantially ineffective by the second value.

Referring now to FIGS. 4A to 4C and FIGS. 5A to 5C a detailed analysis of the effects of using the multi-reflection element 102 in the catadioptric system 10 is explained. Specifically, as discussed above, by ensuring that the light flux undergoes more than two reflections within the catadioptric group 100, chromatic aberrations may be avoided because the light flux is not transmitted trough numerous refractive elements. In addition, as a result of the multiple reflections that occur within the multi-reflections optical element (between different shapes of the object-side surface 102a and image-side surface 102b), focusing can be achieved at relatively short distances. This allows for the intermediate image plane IMP1 to be located either within the body of the optical element itself, at the apex of the image-side surface, or exactly at a predetermined position where obscuration and aberrations can be minimized. In this manner, obscuration can be appropriately controlled.

Generally, the obscuration ratio, which characterizes the fraction of blocked illumination in an optical system, may be defined by the following expression (7):

$$\text{Obscuration} = \frac{\sin\theta_l}{\sin\theta_m} \quad (7)$$

where $\theta_l$ is the lowest angle of a ray incident on the optical element at the aperture edge (hereafter $\theta_l$ will be referred to as the "lowest obscuration angle"), and $\theta_m$ is the marginal angle of an entering light ray determined by the numerical aperture (NA), as defined below in expression (8). These two angles can be manipulated to achieve a desired or required obscuration ratio.

NA is determined by the instruments' ability to gather enough light to resolve fine object details. In terms of its ability to gather enough light, the NA of a microscope is defined by expression (8).

$$NA = N_o \sin\theta_m \quad (8)$$

where $N_o$ is the refractive index of the medium in object space, $\theta_m$ is the angle formed between the marginal ray that comes from the object and the normal to the surface where the marginal ray impinges (hereinafter $\theta_m$ is referred to as the "marginal angle"). Notably, in order to increase the numerical aperture in the object space, it is preferable that the object is submerged in an immersion fluid whose refractive index substantially matches the refractive index of the first optical element.

In consideration of the lowest obscuration angle and the marginal angle, expression (7) can be simplified to obtain expression (9), as follows:

$$k = \frac{\theta_l}{\theta_m} \quad (9)$$

where k may be generally referred to as an effective approximation of the obscuration ratio, or simply as the "obscuration ratio".

Accordingly, from equations (7) through (9), it can be seen that obscuration directly affects the minimum object working distance, and depends on the numerical aperture. An obscuration ratio larger than a certain threshold can cause significant degradation in image contrast and loss of light intensity, which in turn degrades the quality of a resultant image. Any attempt to reduce obscuration, for example, by varying the working distance of the object, will be reflected on noticeable aberrations.

As noted in the Background section, various attempts have been made in the prior art to increase the numerical aperture by providing a first lens element that subjects an incident light flux to two reflections within it. This solution is considered to be suboptimal because it suffers of large obscuration ratios.

In contrast, according to at least one exemplary embodiment of the present invention, the multi-reflections optical element 102 can be specifically designed such that the light flux undergoes 4, 6, 8 or more reflections before exiting. As a light flux with very high numerical aperture enters the multi-reflections optical element 102 through the input surface $S_{in}$ (around the optical axis), and is progressively reflected radially first towards the outer edge of the lens and then towards the optical axis thereof, an equivalent (effective) optical path and focusing distance increases without submitting the light flux to aberrations conventionally generated by scattering when light travels through several stages of free space and refractive or reflective components.

FIGS. 4A, 4B and 4C illustrate exemplary configurations of a multi-reflections optical component as envisioned by the present inventors where the light flux is reflected 4, 6 and 8 times, respectively. Notably, the concave shape of image-side surface 102b, in the optical element 102, generates outward Petzval curvature, but the multiple reflections prevent excessive astigmatism.

In another aspect, when the object is relatively distant from the multi reflection component, it allows for reducing obscuration which is determined by the aperture on the object-side surface 102a. However to achieve a high number of reflections, the optical thickness and diameter of the optical element have to be increased. FIG. 4D indicates that by increasing the number of reflections obscuration can be minimized at relatively small increments in the central thickness of the optical element 102. This is because as the number of reflections increases, the shape of the image-side surface 102b needs to gradually separate further from the object-side surface 102a, so that the light flux after being reflected from a reflection region R1 can go to the outer edge of the lens on the object-side surface 102a. This can enlarge the area of the incidence surface $S_{in}$ so that a ray coming from the object O can pass through $S_{in}$ more widely. Meanwhile, the obscuration of the multi-reflection optical component on the object-side having 4, 6 or 8 reflections may be determined by the location of reflective regions R4, R6 or R8, respectively, but not R2. Specifically, locations of R4 for 4 reflections, R6 for 6 reflections or R8 for 8 reflections are further from the optical axis AX on the object-side surface 102a than R2 for 2 reflections. That is, the incidence surface $S_{in}$ for 2 reflections component is smaller than that for a 4, 6 or 8 reflections component. In other words, as the number of reflections increases so does the aperture diameter and thickness in the optical element 102. However, the cost of providing a larger lens is substantially offset by minimizing the number of optical elements in the optical system and by improved image quality.

For the values graphed in FIG. 4D, obscuration was defined as $\theta_{in}$ divided by 68 degrees. And, in FIG. 4D, it can be seen that by increasing the number of reflections, obscuration can be minimized at small increments in central thickness of the optical element. Particularly, in FIG. 4D it can be appreciated that for 4 reflections and above obscuration can be maintained below 30% for an optical component having a thickness between 50 and 80 mm.

Figure 5B:
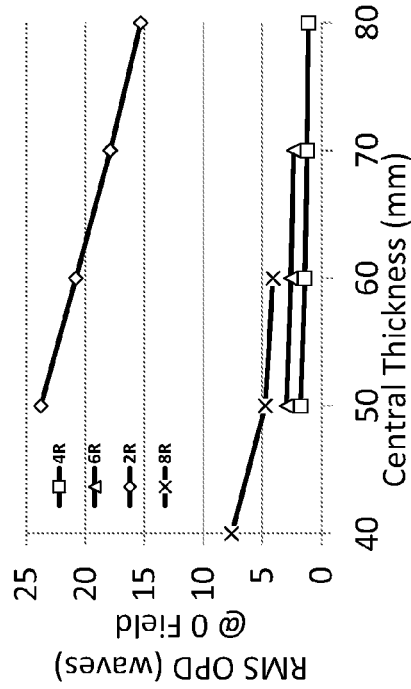
FIG. 5B illustrates on-axis aberrations.
Figure 5D:
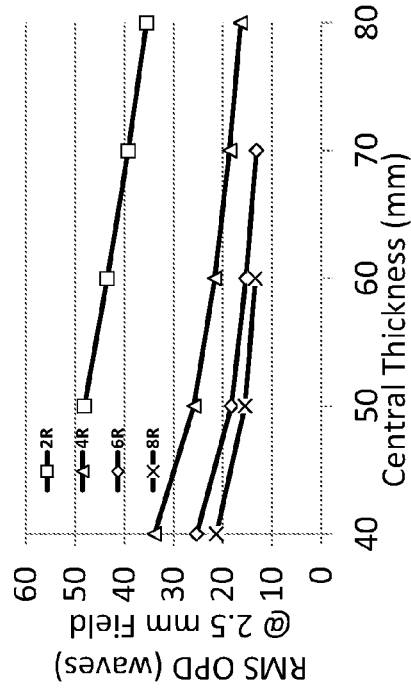
FIGS. 5C and 5D illustrate off-axis aberrations as a function of the number of reflections and central thickness of the multi-reflection optical element, in accordance with certain embodiments of the present invention.
Figure 5A:
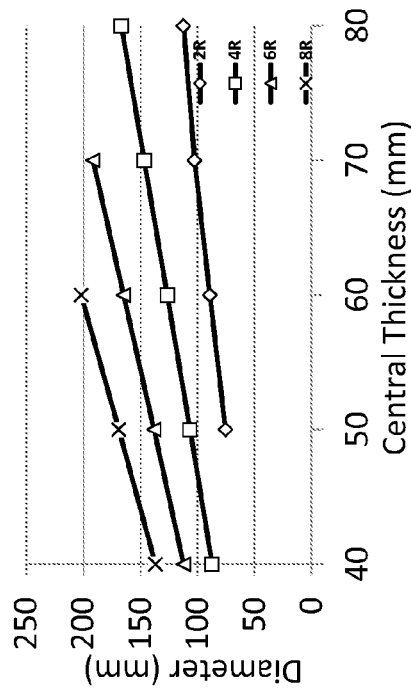
FIG. 5A illustrates diameter and central thickness parameters of the multi-reflection optical element as a function of the number of reflections, in accordance with certain embodiments of the present invention.

In addition, as illustrated in the graph of FIG. 5A, a linear dependence of component diameter on central thickness is observed. In FIG. 5A, the slope is dependent on the number of reflections (R). From FIG. 5A, therefore, it can be inferred that the central thickness and the diameter of the optical component linearly increase to obtain a predetermined number of reflections. Furthermore, as shown in FIG. 5B, it is evident that a multi reflection component that provides more than two reflections can reduce spherical aberration better than a 2 reflections component because an increase in the number of reflections gives more degree of freedom for aberration compensation. As for off-axis aberration, coma aberration may have the same tendency as spherical aberration, which means that there may be a certain increase. On the other hand, as the number of reflections increase, astigmatism generated by each reflection becomes smaller and the total of the aberration at the intermediate image can be almost negligible.

Figure 5C:
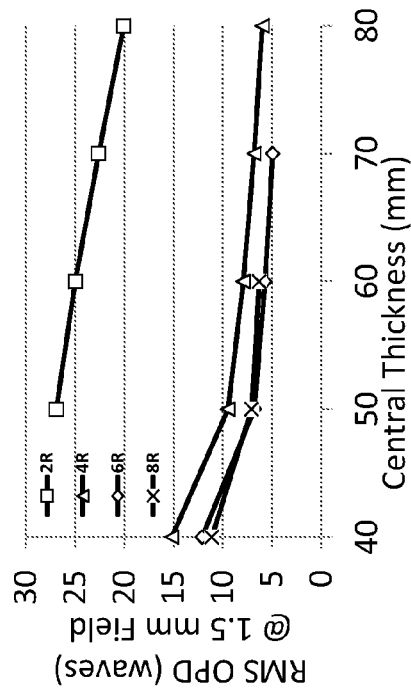

In terms of image quality, as illustrated in FIG. 5B, Root Mean Square (RMS) wavefront errors for on-axis objects show large induced aberrations by a two-reflections optical component. However, increasing the number of reflections to more than 2, as in the embodiments described herein, significantly reduces aberrations in terms of wavefront errors. For off-axis objects, for example, as illustrated in FIGS. 5C and 5D, a two-reflection optical element shows large induced aberrations similar to the on-axis case. However, as the number of reflections increases, the induced aberrations drop. In both of on-axis and off-axis cases, for all numbers of reflections, the optical component's aberrations drop with increased central thickness.

According to the inventors' experimental observations, increasing the number of reflections may affect Petzval curvature. However, this is not necessarily a negative aspect in the multi-reflection optical element disclosed herein. Specifically, if outward Petzval curvature of the optical element increases due to the multiple reflections, such increase can be compensated and cancelled out by inward Petzval curvature induced by other optical components in an optical system.

More specifically, the so-called Petzval sum P is given by expression (10) shown below, where $n_i$ is the index of refraction and $f_i$ is the focal length of the i-th optical element. Petzval radius of curvature is given by a displacement $\Delta x$ of an image point at a height $Y_i$ on the Petzval surface from the paraxial image plane of an image of a plane object produced by an optical system of m lens elements. $\Delta x$ is given by expression (11).

$$\sum_{i=1}^{m} P_i = \sum_{i=1}^{m} \frac{1}{n_i f_i} \qquad (10)$$

$$\Delta x = \frac{Y_i^2}{2} \sum_{i=1}^{m} P_i \qquad (11)$$

Therefore, referring back to FIG. 1, the multi-reflection element 102 with its object-side surface 102a being substantially planar, and its image-side surface 102b being concave towards the object plane can generate the first intermediate image IIM1 with outward Petzval curvature due to the more-than-two reflections. This allows the optical system 10 to enhance its light capturing capability and to increase its objective field of view (FOV). Here it should be noted that, in accordance with Numerical Example 1 (see Table 3) and by using expressions (10) and (11) above, the Petzval sum of the catadioptric group 100 was found to be +0.011 in the exemplary embodiment shown in FIG. 1. In addition, the concave shape of image-side surface 102b, in the optical element 102, generates outward Petzval curvature, but the multiple reflections prevent excessive astigmatism.

Axial (otherwise known as the longitudinal component of) chromatic aberration L is given by expression (12).

$$L = -\frac{1}{u_k'^2} \sum_{i=1}^{m} \frac{h_i^2}{f_i V_i} \qquad (12)$$

where $h_i$ is the paraxial marginal ray height, $V_i$ is the Abbe number, and $u'_k$ is the paraxial ray angle on the image plane.

Axial chromatic aberration generated in the catadioptric group 100 may be imperceptible even when the light flux passes through the image-side surface 102b after being reflected more than times within the optical element 102. More specifically, at the first intermediate image plane IMP1, the light is collimated and focused so that the paraxial marginal ray height is almost zero, which means that axial chromatic aberration is low or substantially negligible. However, because of the specific concave design of the image-side surface of optical element 102, and due to the multiple back and forth reflections, non-paraxial rays forming the first intermediate image IIM1 at the first intermediate image plane IMP1 may still generate certain amount of axial aberration. Therefore, to minimize chromatic aberration it is advantageous to intentionally locate the first intermediate image plane IMP1 on the apex of the image-side surface 102b, or immediately before the image-side surface of the optical element 102, as illustrated in FIG. 1. Accordingly, it can be said that the catadioptric group 100 forms the first intermediate image IIM1 at the first intermediate image plane IMP1 with substantially negligible axial chromatic aberration and an outward Petzval curvature. However, the outward Petzval curvature generated by the catadioptric group 100 can be easily corrected by other optical components in the optical system.

Specifically, referring still to FIG. 1, it is noted that the catadioptric group 200, including the first Mangin mirror 202 and the second Mangin mirror 204, is specifically configured to generate an outward Petzval curvature. Similarly, the field lens group 300 including the first lens unit 302, the second lens unit 304 and third lens unit 306 is configured to generate overcorrected chromatic aberration. Specifically, light arriving at the first intermediate image plane IMP1 passes through a transmissive region on the object-side surface 202a of the first Mangin mirror 202, is then reflected on a reflective surface (image-side surface 204b) of the second Mangin mirror 204, and the reflected light again enters the first Mangin mirror 202 through the image-side surface 202b. Next, from the reflective surface (secondary mirror) of the first Mangin mirror 202, light is reflected towards a transmissive region of the second Mangin mirror 204 in a central region thereof. The light passing through the transmissive region of the second Mangin mirror 204 now proceeds through to the field lens group 300. In the field lens group 300, the lenses 302, 304 and 306 focus light onto the second intermediate image plane IMP2 to form the second intermediate image IIM2 therein. Notably, one of the functions of the Mangin mirrors 202 and 204 is to further increase an outward tendency of the Petzval curvature already provided by the catadioptric group 100, and to generate overcorrected chromatic aberration. Specifically, the second Mangin mirror 204 has a concave shape facing towards the object plane and includes an object-side surface 204a and an image-side surface 204b. The concave shape of the object-side surface 204a creates the overcorrected axial chromatic aberration, and the concave shape of the image-side surface 204b generates the outward Petzval curvature. In accordance with Numerical Example 1 (see Table 3) and by using expression (10), the Petzval sum for the catadioptric group 200 was found to be +0.0023, and that for the field lens group 300 was found to be −0.012 in an embodiment of the present invention. That is, the field lens group 300, and in particular the lens 304, generate overcorrected chromatic aberration and inward Petzval curvature.

The dioptric group 400, which includes a plurality of optical lenses (ten lenses are shown in FIG. 1), is configured to magnify the second intermediate image IIM2 to form the final image FIM at the final imaging plane IP. The lenses in the field lens group 300 are not limited to any particular shape or order, but it would be preferred that the field lens group 300 as a whole generates an inward Petzval curvature sufficient to compensate and correct the outward Petzval curvature generated by the first catadioptric group 100 and second catadioptric group 200. In terms of axial chromatic aberration, as discussed elsewhere in this application, the first catadioptric group 100 generates substantially negligible axial chromatic aberration, and the second catadioptric group 200 generates slightly overcorrected axis chromatic aberration. In turn, the field lens group 300 as a whole generates overcorrected axial chromatic aberration. Therefore, it is preferable that the dioptric group 400 generates undercorrected axial chromatic aberration sufficient to compensate and correct the overcorrected axial chromatic aberration generated by the second catadioptric group 200 and the field lens group 300. In simulations performed by the inventors, based on data shown in Table 3 (corresponding to numerical Example 1) and by using mathematical expression (9), the Petzval sum of the dioptric group 400 was found to be 0.001. Accordingly, persons having ordinary skill in the art will appreciate that the inward (positive) Petzval curvature of the field lens group 300 effectively compensates for the outward (negative) Petzval curvature of the catadioptric group 100, that of the second catadioptric group 200, and that of the dioptric group 400.

In summary therefore, in the optical system 10 of FIG. 1, the first catadioptric group 100 is implemented by a multi-reflection optical element 102 which is configured to generate outward Petzval curvature and minimize axial chromatic aberration to be negligible. The catadioptric group 200 is configured to generate outward Petzval curvature and overcorrected axial chromatic aberration; the field lens group 300 is configured to generate overcorrected axial chromatic aberration and inward Petzval curvature; and the dioptric group 400 is configured to generate outward Petzval curvature and undercorrected axial chromatic aberration. In this manner, each optical group can be independently and individually designed without strict restrictions in terms of control of aberrations, but when assembled together as a whole the optical groups in axis alignment with the multi-reflection optical component are designed to compensate aberrations to obtain an optimized final image with an exceptionally large FOV and substantially free of aberrations. More specifically, the intentionally generated outward Petzval curvature of the catadioptric group 100 and catadioptric group 200 are compensated and corrected by the inward Petzval curvature of the field lens group 300. Similarly, the overcorrected axial chromatic aberration generated by the catadioptric group 200 and the field lens group 300 is strategically compensated and corrected with the under corrected axial chromatic aberration of the dioptric group 400. The relationship of each optical group in the optical imaging system 10 to Petzval curvature and to axial chromatic aberration is summarized below in Table 1.

TABLE 1

Summary of optical power and aberration characteristics of optical system 10 illustrated in FIG. 1. In Table 1, exemplary values calculated based on expressions (10), (11) and (12) are provided in parenthesis.

|  | CAT Group 100 | CAT Group 200 | LG Group 300 | DIO Group 400 |
|---|---|---|---|---|
| Optical Power | Positive (0.0059) | Positive (0.018) | Positive (0.019) | Positive (0.025) |
| Petzval Curvature | Outward (0.011) | Outward (0.0023) | Inward (−0.012) | Outward (0.001) |

TABLE 1-continued

Summary of optical power and aberration characteristics of optical system 10 illustrated in FIG. 1. In Table 1, exemplary values calculated based on expressions (10), (11) and (12) are provided in parenthesis.

|  | CAT Group 100 | CAT Group 200 | LG Group 300 | DIO Group 400 |
|---|---|---|---|---|
| Axial Chromatic Aberration | None (0) | Overcorrected (−11.4) | Overcorrected (−1.1) | Under-corrected (12.1) |

Turning now to FIG. 6, a catadioptric system 20 is described. FIG. 6 illustrates main components of a catadioptric system 20 according to a second exemplary embodiment of the present invention. In FIG. 6, the same elements as those shown FIG. 1 are denoted by the same reference numerals or labels. In the second exemplary embodiment, the configuration of the catadioptric group 100 is substantially similar to the configuration in the first exemplary embodiment. Accordingly, descriptions thereof will not be provided to avoid unnecessary repetition. It should be noted that while the catadioptric system 10 of FIG. 1 forms a first and second intermediate images IIM1 and IIM2 at the first and second intermediate image planes IMP1 and IMP2, respectively, the catadioptric system 20 of FIG. 6 forms only one intermediate image IIM1 at the intermediate image plane IMP1.

Notably, the catadioptric system 20 according to the second embodiment represents an example of a microscope objective system. In the catadioptric system illustrated in FIG. 6, a catadioptric group 100 (first catadioptric group), a catadioptric group 500 (second catadioptric group), and a lens group 600 (lens group) have been arranged in this order, between an object plane OP and an image plane IP, in axial alignment with each other. As mentioned above, the configuration of the catadioptric group 100 in this embodiment (FIG. 6) is substantially similar to the configuration in the first exemplary embodiment (FIG. 1). The catadioptric group 500 includes a catadioptric shell made of aspheric surfaces, including a primary mirror 504 and a secondary mirror 502. The lens group 600 includes a plurality of lenses 602, 604, 606, 608, 610, 612, 614, 616, 618, 620 and 622 (11 lenses). As illustrated in FIG. 6, the catadioptric group 100 includes a multi-reflection optical element 102, which has the same structure and operates in the same manner as that described in the first exemplary embodiment. The catadioptric group (shell element) 500 comprises the primary mirror 504 and the secondary mirror 502; these two mirrors have a structure and function substantially similar to the catadioptric group 200 described above in the previous embodiment. In addition, the lens group 600 is similar to a combination of the field lens group 300 and the dioptric group 400 described in the first embodiment.

In operation, the catadioptric group 100 is configured to collect a light flux from an object scene (an object O located at an object plane OP), reflect the light flux more than two times within reflective surfaces therein, and focus the collected light onto an intermediate image plane (IMP1) to from a first intermediate image (IIM1). The catadioptric group 500 is configured to collect the light flux from the intermediate image plane IMP1, and reflect the light flux at least two times between the primary mirror 504 and secondary mirror 502. The lens group 600 receives the light flux exiting from the catadioptric group 500, and focuses the light flux onto the image plane (IP) to from a final image (FIM). Notably, the lens group 600 is configured to magnify the intermediate image IIM1, and form a final image (FIM) at an image plane IP.

According to a numerical example, the microscope objective represented by FIG. 6 is configured to operate in the visible spectral band (approximately 400-700 nm) at a 20× magnification and a 1.65 NA. The object working distance may be as large as 0.25 mm or larger. Obscuration must be lower than or equal to 30%; and the size of field-of-view should be ±0.875 mm. Based on these target requirements, the parameters for the catadioptric group 100 of the optical system 20 can be optimized using the above described conditional expressions (1) through (2), and the catadioptric group 500 and the lens group 600 can be optimized based on the concepts of mathematical expressions (7) through (12). In addition, to more precisely match the catadioptric group 500 to the multi-reflection optical element 102, the catadioptric 500 may be designed as a separate optical stage that uses the intermediate image IIM1 (formed by optical element 102) as its input to form a final image FIM.

Figure 7:
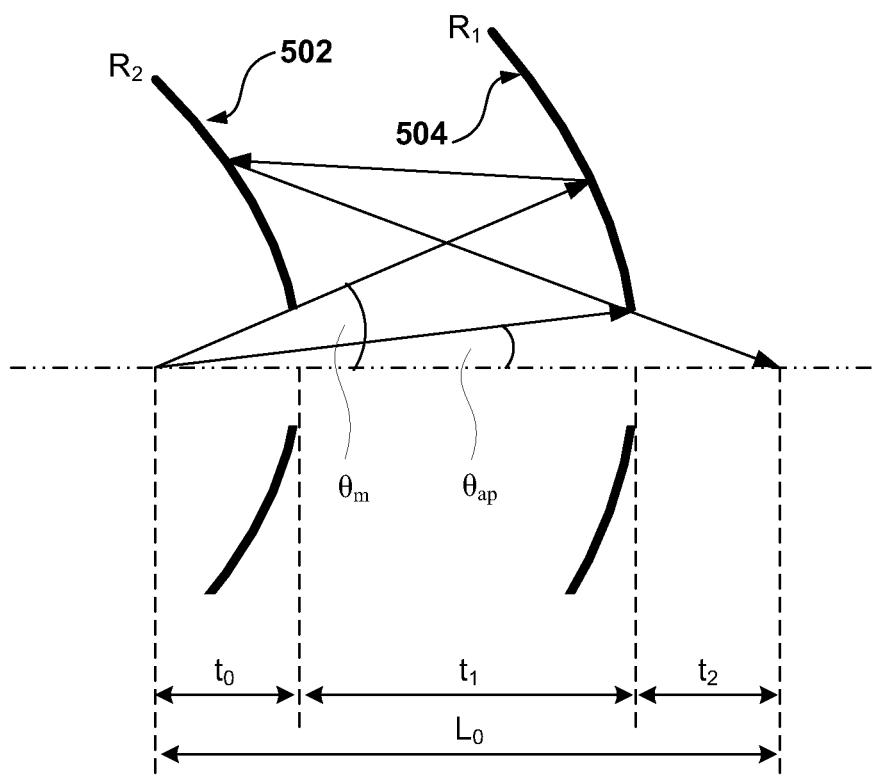
FIG. 7 illustrates a catadioptric arrangement and parameter calculation thereof, in accordance with certain embodiments of the present invention.

Specifically, FIG. 7 illustrates one possible configuration of the catadioptric group 500. As illustrated in FIG. 7, a light flux incident on the catadioptric group 500 passes through a central region (entrance pupil or aperture) of the secondary mirror 502 and impinges on the edge on an exit pupil of the primary mirror 504. Thereafter, the light flux undergoes two reflections between the primary mirror 504 and secondary mirror 502, and exits the catadioptric group 500 through the central region (exit pupil) of the primary mirror 504. In the catadioptric system 20 of FIG. 6, aberrations induced by the mirrors 504 and 502 are suppressed by the lens group 600.

In the catadioptric arrangement of FIG. 7, given a target paraxial magnification $M_0$, obscuration $k_0$, and total length $L_0$, the radii of curvatures $R_1$ and $R_2$ of mirrors 504 and 502, respectively, can be formulated as a function of axial distances ($t_1$ and $t_2$) of the two mirrors, as follows:

$$R_1 = \frac{2t_1 k_0(t_0 + t_1)}{t_o(1 - k_0) - 2k_o t_1} \quad (13)$$

$$R_2 = \frac{2(t_1 + t_2)}{1 - \frac{k_o}{t_o}(t_1 + t_2)(\phi_1(t_o + t_1) - 1)} \quad (14)$$

where $$t_o = \frac{k_o L_o}{1 - M_o} \quad (15)$$

$\phi_1$ is power of the primary mirror 504;
$L_o$ is the target total length of the catadioptric group formed by the primary mirror 504 and the secondary mirror 502. Where the total length is a distance from object to image;
$t_0$ is the distance from the object plane to the apex of secondary mirror 502. Here it should be noted that the object plane for the secondary mirror 502 is not the same as the object plane OP of the entire system. Instead the term "object plane" refers to the object plane of the mirror itself;

$t_1$ is the axial distance between the primary mirror 504 and secondary mirror 502;

$t_2$ is a distance from the apex of the primary mirror 504 to an image plane. Here the term "image plane" refers to the image plane of the mirror itself; and $k_o$ is the target obscuration ratio defined by expression (16), as follows:

$$k_o = \frac{\theta_{ap}}{\theta_m} \tag{16}$$

where $\theta_m$ is the angle of the marginal ray passing at the edge of the aperture (entrance pupil) of the secondary mirror 502, and $\theta_{ap}$ is the angle of the ray hitting the primary mirror 504 at the aperture (exit pupil) edge. It should be noted, however, that the above equations can be used to obtain an initial estimate for the values $R_1$ and $R_2$. However, to calculate more accurate values, the error in obscuration value (or the target obscuration value) is used to modify $k_o$ and new $R_1$ and $R_2$ values are calculated iteratively. After a few iterations, the actual obscuration converges (matches) with the desired one, and precise values for $R_1$ and $R_2$ can be reached.

The inventors herein have noticed that conventional catadioptric systems are difficult to assemble due to an excessive number of optical elements, and generally suffer of high obscuration ratios. However, when applying the above configuration and mathematical principles to construct a catadioptric system with the multi-reflection optical element 102, as disclosed herein, obscuration can be dramatically reduced without sacrificing image quality. In addition, a catadioptric system can be designed to be up to 15% shorter than in conventional designs. Moreover, wavefront aberration with respect to white light can be substantially suppressed.

Figure 8A:
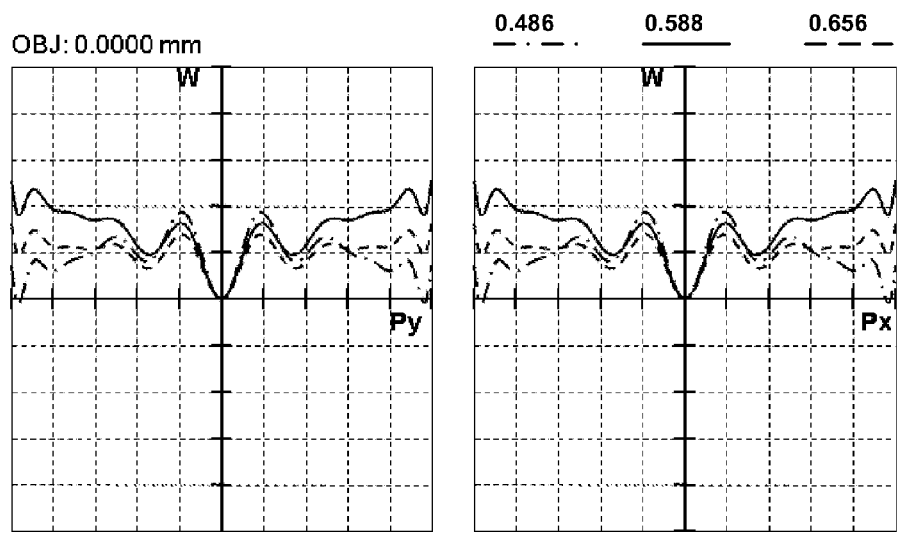
FIGS. 8A, 8B and 8C are graphical plots illustrating exemplary on-axis and off-axis results of wavefront aberration at three different wavelengths in a catadioptric system including the multi-reflection optical component and having one intermediate image, in accordance with embodiments of the present invention.
Figure 8B:
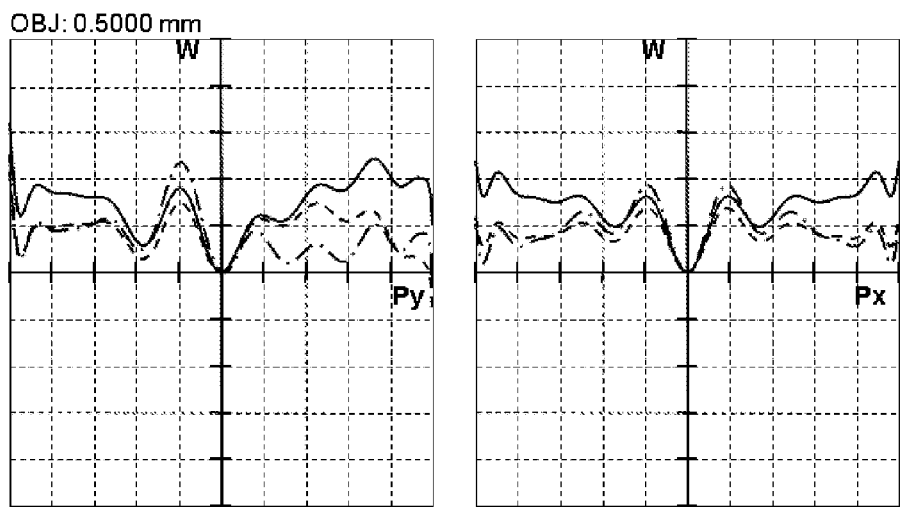
Figure 8C:
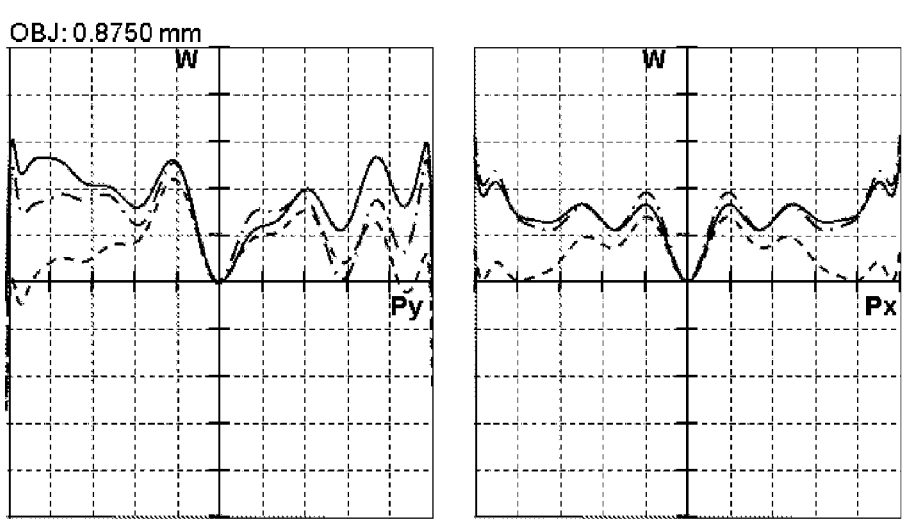

FIGS. 8A, 8B and 8C are graphical plots illustrating optical path difference of an exemplary catadioptric system, according to the second exemplary embodiment (FIG. 6) of the present invention. Specifically, these graphical plots illustrate optical path difference (OPD) errors plotted at 0 mm (FIG. 8A), 0.5 mm (FIG. 8B), and 0.875 mm (FIG. 8C) field points from the center of the field of view. The maximum scale for each graph in FIGS. 8A to 8C is ±0.200 waves. A dash-dotted — • — • — line represents OPD error at 486 nm wavelength; a dashed — — — line represents OPD error at 588 nm wavelength, and a solid line ——— represents OPD error at 656 nm wavelength. Px is the normalized entrance pupil coordinate in x direction, Py is the normalized entrance pupil coordinate in y direction and W is optical path difference as a function of pupil coordinate.

Figure 9A:
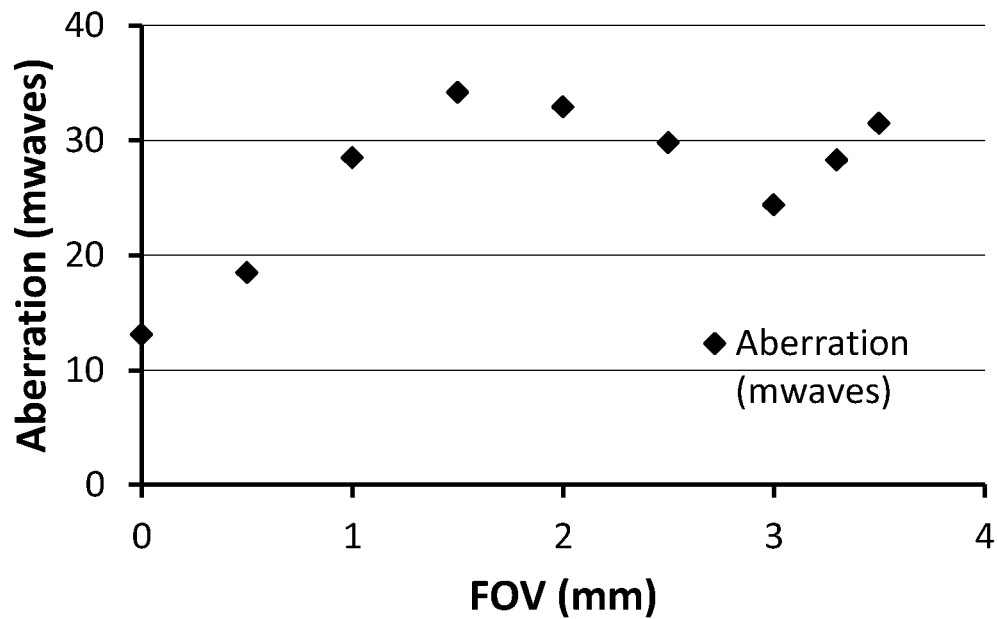
FIG. 9A is a graphical plot of RMS wavefront error across the field of view of a catadioptric system having two intermediate images, in accordance with the embodiment shown in FIG. 1.
Figure 9B:
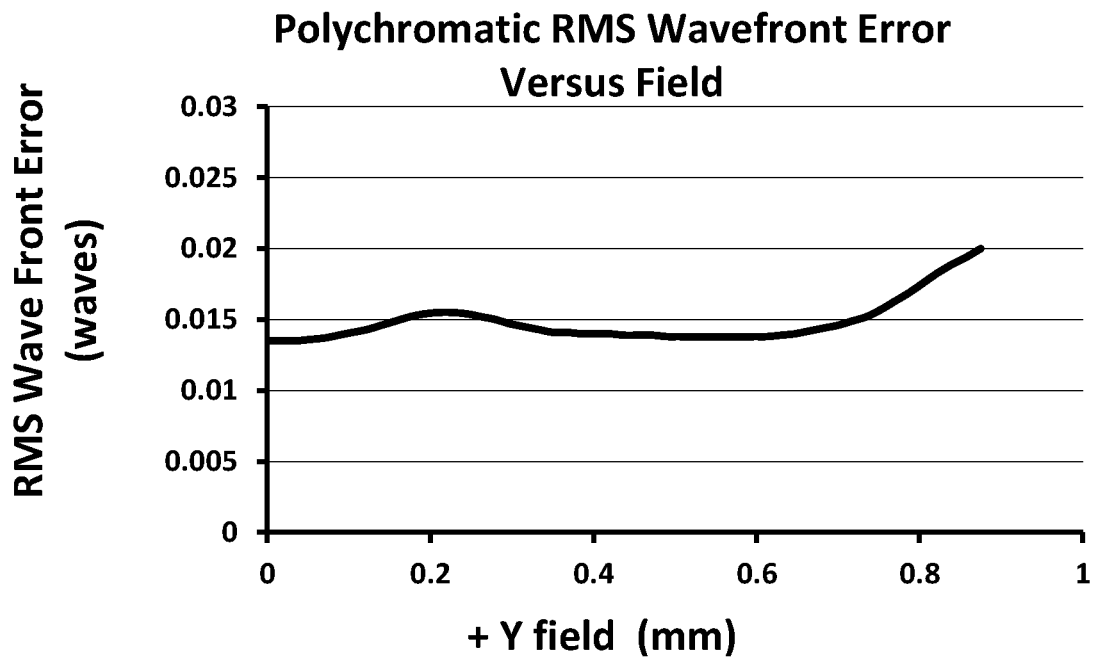
FIG. 9B is a graphical plot of polychromatic Root Mean Square (RMS) wavefront error across the field of view of a catadioptric system having one intermediate image, in accordance with an embodiment of the present invention.

FIG. 9A illustrates RMS wavefront errors across the field of view of the catadioptric system 10, according to the first embodiment (FIG. 1) of the present invention. FIG. 9B illustrates a graph of polychromatic RMS wavefront errors across the field of view of an exemplary catadioptric system, according to the second embodiment (FIG. 6) of the present invention.

Figure 10:
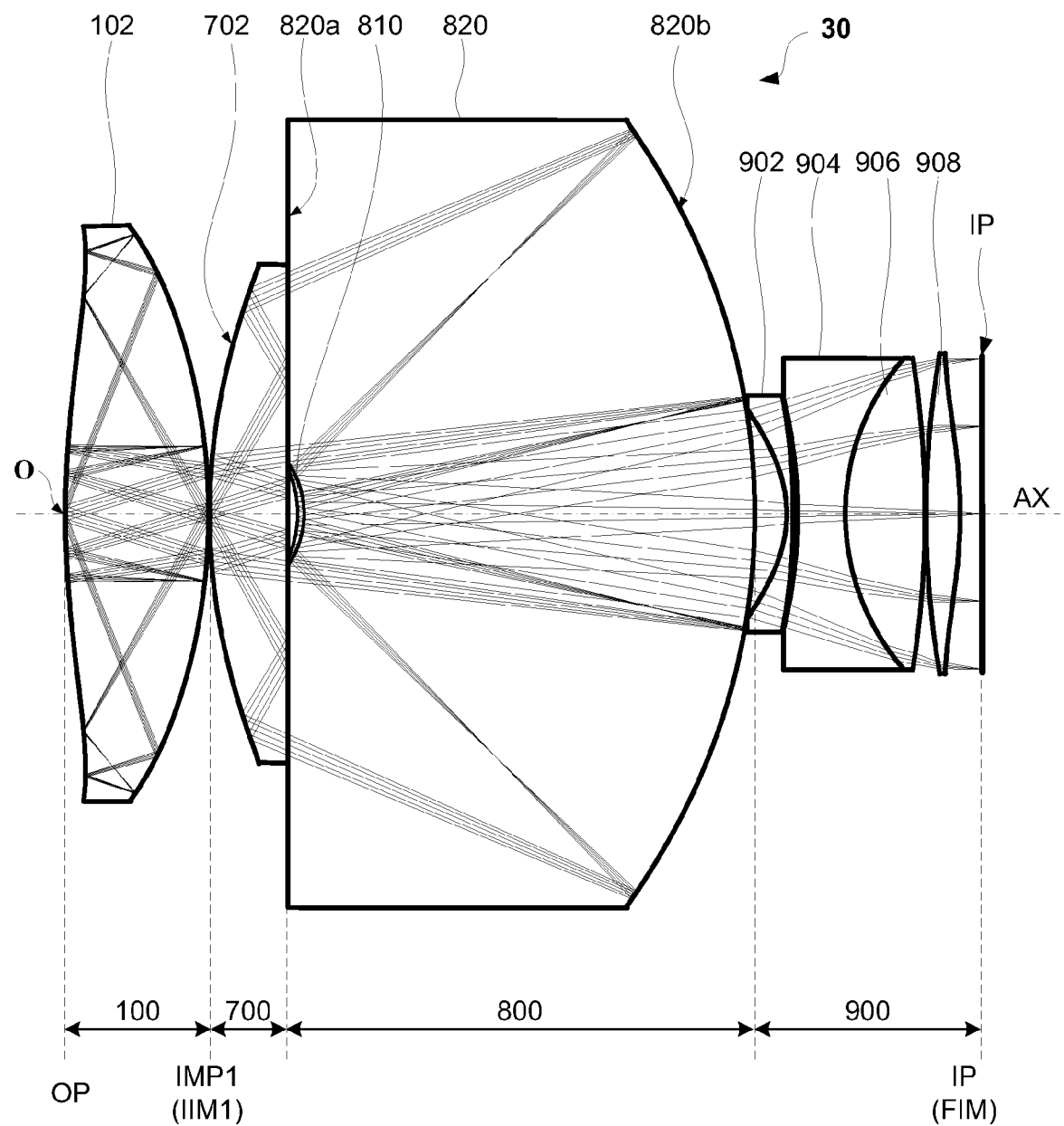
FIG. 10 illustrates a catadioptric optical system including a first multi-reflection optical element forming a single intermediate image, and catadioptric optical element having a surface with total internal reflection (TIR) and specular reflection, in accordance with an embodiment of the present invention.

Turning now to FIG. 10, main components of a catadioptric system 30 are described, according to a third exemplary embodiment. In FIG. 10, elements having the same structure and function as those shown FIG. 1 are denoted by the same reference numerals or labels. In this third exemplary embodiment, the configuration of the catadioptric group 100 is substantially similar to the configuration and function shown in the first exemplary embodiment (FIG. 1). Accordingly, descriptions of already described elements will be omitted to avoid unnecessary duplication. It should be noted, however, that while the catadioptric system 10 of FIG. 1 forms first and second intermediate images IIM1 and IIM2 at the first and second intermediate image planes IMP1 and IMP2, respectively, the catadioptric system 30 of this embodiment (FIG. 10) forms only one intermediate image IIM1 at the intermediate image plane IMP1.

The catadioptric system illustrated in FIG. 10 includes a catadioptric group 100 (first catadioptric group), a catadioptric group 700 (second catadioptric group), a catadioptric group 800 (third catadioptric group), and a field lens group 900 (lens group), which are arranged in this order, between an object plane OP and an image plane IP, in axial alignment with each other. As in the first embodiment, the first catadioptric group 100 includes a multi-reflection optical element 102. The multi-reflection optical element 102 consists of a single solid lens with predefined reflective and transmissive regions on the object-side and image-side thereof. The second catadioptric group 700 includes a solid lens 702 having a curved object-side surface 702a and a flat image-side surface 702b. In the solid lens 702, the curved object-side surface 702a includes a central transparent region and a reflective region surrounding the transparent region; the flat image-side surface 702b includes a central non-transmissive region, a ring-shaped reflective region, and an outer transparent region.

The third catadioptric group 800 includes a small lens 810 and a large lens 820 in axial alignment with each other in order from the object plane to the image plane. The small lens 810 is a meniscus lens having a reflective object-side surface 810a and a transparent image-side surface 810b. The large lens 820 includes a transmissive substantially flat object-side surface 820a, and a reflective concave image-side surface 820b. The lens group 900 includes a plurality of lenses 902, 904, 906 and 908 (4 lenses in this example).

In the present embodiment, FIG. 11 illustrates a side view of the solid lens 702 (center part of the drawing), a plane view of the object-side surface 702a (left side of the drawing), and a plane view of the image-side surface 702b (right side of the drawing). The object-side surface 702a includes, and a circular transmissive region 730 (object-side transmissive region) centered on the optical axis AX, and a reflective region 720 (white area) in a rotationally symmetric zone surrounding the circular transmissive region 730 (shaded area). At least the reflective region 720 has a curved shape concave towards the image side thereof (concave towards the image-side surface 702b). The reflective region 720 is preferably coated with a highly reflective coating (film) to form what can be considered a concave mirror. To that end, reflective region 720 on the object-side surface 702a may be implemented as either a spherical or aspherical surface. It should be noted, however, that an aspherical surface may be preferable to minimize spherical aberrations. That is, the reflective region 720 is an area of the solid lens 702 in an outer region object-side surface 702a, which may be a spheric or aspheric surface coated with a reflective coating film. The circular transmissive region 730 is an area concentric to the optical axis AX and not coated with any reflective coating or film. Optionally, however, the circular transmissive region 730 may be coated with an anti-reflection coating (film) so as to increase transmission of light rays therethrough from the object O towards the image-side surface 702b.

The planar image-side surface 702b includes a non-transmissive region 770 (also referred to as light-blocking or obscuration region) in the center thereof, a light reflecting region 750 (ring-shaped reflective region) in a rotationally symmetric zone surrounding the non-transmissive region 770, and a transparent region 710 also in a rotationally symmetric region around the ring-shaped light reflecting region 750 on the outer region (white area) of the image-side surface 702b. The transparent region 710 serves both as a total internal reflection (TIR) region and a transmissive region. The central non-transmissive region 770 may be coated with light-blocking (or light-attenuating) materials; thus, this non-transmissive region 770 forms an obscuration or "obscured" region on the image-side surface 702b of the solid lens 702. The transparent region 710 is preferably devoid of any coatings or films, so as to easily transmit light incident thereupon at predetermined incidence angles. The light reflecting region 750 is preferably coated with a coating of highly reflective materials similar to that of the reflective region 720 on the object-side surface 702a.

More specifically, as illustrated in FIG. 11, the light reflecting region 750 is disposed in an area of the image-side surface 702b, in a rotationally symmetric zone around the central non-transmissive region 770 and surrounded by the transparent region 710. This ring-shaped light reflecting region 750 serves to extend a reflective region of the image-side surface 702b beyond a TIR region. As explained in further detail below, the area of the ring-shaped light reflecting region 750 is associated with and determined by the critical angle $\theta_c$ and a lowest angle $\theta_l$ necessary for satisfying a required obscuration ratio.

Referring again to the side view of the solid lens 702 in FIG. 11, light rays passing through the multi-reflection optical element 102 are focused at the intermediate image plane (IMP1) to form the first intermediate image (IIM1). From the IMP1, the light flux passes through the circular transmissive region 730 of the object-side surface 702a, and travels towards the image-side surface 702b. As it is understood by persons having ordinary skill in the art, at the boundary of the image-side surface 702b and the medium surrounding this surface, part of the light flux may refract and transmit, and part of the light flux may reflect and return, in accordance with basic optical principles such as Snell's law. Heretofore, it has been a conventional technique to allow light rays impinging on the image-side surface 702b at an incident angle smaller than the critical angle $\theta_c$ not to be reflected, but to be refracted (transmitted) therethrough. These refracted rays may degrade image contrast or cause loses of light intensity by exacerbating obscuration, thereby degrading the imaging capability of the optical element. In contrast, in accordance with the present embodiment, light rays impinging on the image-side surface 702b at an incident angle smaller than the critical angle $\theta_c$ and greater than a lowest angle $\theta_l$ necessary for satisfying a required obscuration ratio are reflected from the image-side surface 702b by virtue of the light reflecting region 750. Hereinafter $\theta_l$ will be referred to as "the lowest obscuration angle". In this manner, the light rays impinging on the image-side surface 702b at an incident angle smaller than the critical angle $\theta_c$ and greater than the lowest obscuration angle $\theta_l$ also contribute to image formation. As a result, improved image contrast and optimal light intensity can be advantageously achieved to obtain high-quality images essentially free of optical aberrations.

Figure 12A:
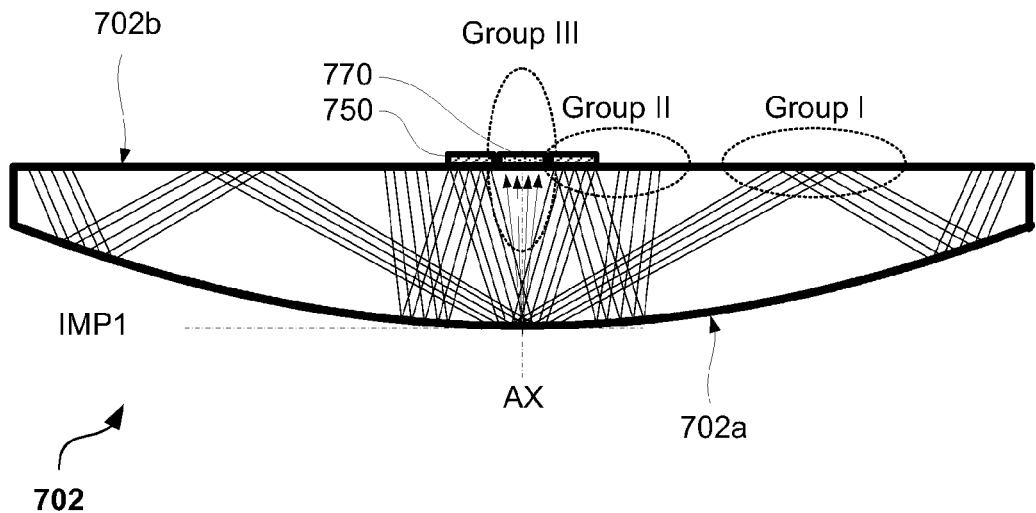
FIG. 12A illustrates a side view of the catadioptric optical element with an exemplary ray-tracing therein, in accordance with the embodiment of FIG. 10.
Figure 12B:
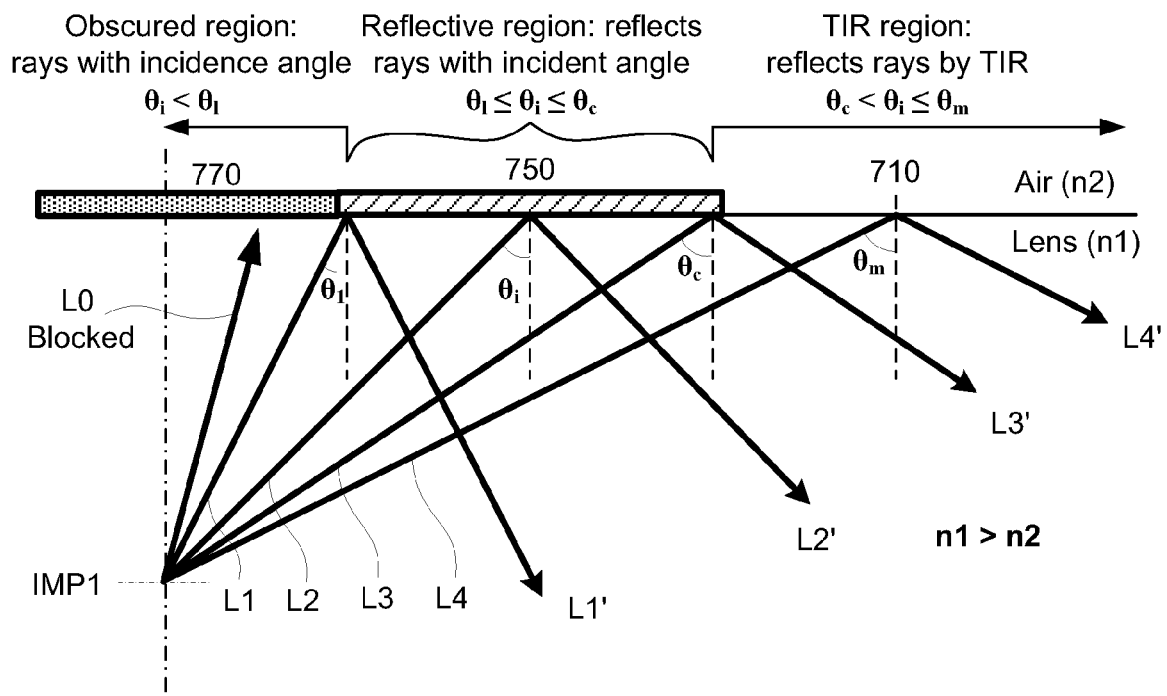
FIG. 12B illustrates the geometry of rays reflected at a plane interface between the image-side surface of the catadioptric optical element and a medium surrounding that surface.

Turning now to FIGS. 12A and 12B, exemplary operation of the solid lens 702 in the catadioptric group 700, in accordance with the present embodiment, will be explained in detail. FIG. 12A illustrates the side view of the solid lens 702 with an exemplary ray-tracing therein; and FIG. 12B illustrates the geometry of rays reflected at a plane interface (boundary) between the image-side surface 702b of the solid lens 702 and a medium (air) surrounding the image-side surface 702b. More specifically, as illustrated in FIG. 12A, for ease of illustration, the light reflecting region 750 is shown as a reflective film overlaid on the image-side surface 702b. Similarly, non-transmissive region 770 is shown as a non-transmissive (light attenuating) coating or film overlaid on the image-side surface 702b. As illustrated in FIG. 12B, the light reflecting region 750 is configured to totally reflect (by specular reflection) rays of the light flux incident thereon at an incident angle equal to or smaller than the critical angle $\theta_c$ and equal to or larger than the lowest obscuration angle $\theta_l$.

The light reflecting region 750 (image-side surface reflective region) may be formed by coating the corresponding part of image-side surface 702b with a highly reflective film. Alternatively, the light reflecting region 750 may be formed by adding (e.g., attaching or cementing) a ring-shaped mirror to a corresponding part of the image-side surface 702b. It is envisioned that persons having ordinary skill in the art will recognize, without undue experimentation, other equivalent manners in which the light reflecting region 750 can be implemented. Accordingly, the embodiments of the present invention are not limited to any specific manner in which this ring-shaped light reflecting region 750 may be formed. As long as the ring-shaped reflective region specularly reflects rays of the light flux incident thereupon at the above-discussed angles of incidence, a ring-shaped reflective region formed by any method or structure can be used.

FIG. 12B particularly illustrates the geometry of light rays L1, L2 and L3 specularly reflected from the light reflecting region 750, and light ray L4 reflected from the transparent region 710 by total internal reflection (TIR). Referring to FIG. 12B, it can be noted that the light ray L4 is incident on the transparent region 710 of the image-side surface 702b at an incidence angle greater than the critical angle $\theta_c$. Upon impinging on the transparent region 710, the incident ray L4 undergoes TIR and is reflected as light ray L4'. That is, the rays L4 of the light flux incident on the transparent region 710 at an incidence angle $\theta_i$ greater than the critical angle $\theta_c$ and equal to or smaller than a marginal angle $\theta_m$ are reflected by TIR.

On the other hand, light rays L1, L2 and L3 having an incidence angle $\theta_i$ (where $\theta_i$ is equal to or smaller than the critical angle $\theta_c$ and equal to or greater than the lowest obscuration angle $\theta_l$) impinge on the ring-shaped light reflecting region 750 of the image-side surface 702b, and thus are specularly reflected therefrom as light rays L1', L2' and L3' towards the reflective region 720 of object-side surface 702a. From the reflective region 720 of the object-side surface 702a, light rays L1', L2' and L3' are reflected back towards the transparent region 710 of the image-side surface 702b. This time, since the angle of incidence of rays L1', L2' and L3' on the transparent region 710 is less than the critical angle $\theta_c$, light is transmitted through the transparent region 710. In this manner, in the present embodiment, contrary to conventional techniques, light rays having an incident angle smaller than the critical angle $\theta_c$ are reflected off of the image-side surface 702b and are used to improve image contrast, by optimizing the intensity of the light collected with the solid lens 702. In addition, the central non-transmissive region 770 blocks light rays L0 traveling substantially along the optical axis AX of the solid lens 702, which tend to be detrimental to image quality.

Advantageously, in the catadioptric system 30 according to the present embodiment, when $r_1$ is a curvature radius of the object-side surface 702a and $d_1$ is a distance between the object-side surface 702a and the image-side surface 702b along the optical axis AX of the solid lens 702, the following mathematical expression (17) is satisfied. Expression (17) is based on the geometry of reflections of light rays of Group I and Group II at the boundary of image-side surface 702b, as illustrated in FIGS. 12A and 12B. Details about the mathematical basis of expression (17) are beyond the scope of the present disclosure. However such details may be found in U.S. patent application Ser. No. 13/492,167, filed Jun. 8, 2012 and assigned to Canon Kabushiki Kaisha (co-assignee of the present application), the disclosure of which is hereby incorporated by reference herein for all purposes.

$$\frac{r_1}{d_1} \geq \frac{4\tan\theta_l}{3\tan\theta_l - \tan\theta_c}. \quad (17)$$

Specifically, continuing to refer to FIGS. 12A and 12B, light rays coming from the intermediate image plane IMP1 may be classified into three groups. A first group of rays (Group I) having incidence angles between a marginal angle $\theta_m$ and the critical angle $\theta_c$, a second group of rays (Group II) having incident angles between the critical angle $\theta_c$ and a lowest angle $\theta_l$ necessary to achieve a required obscuration ratio, and a third group of rays (Group III) having incidence angles between $\theta_l$ and 0.

The optical path of Group I, light rays having an incident angle $\theta_i$ between rays having a marginal angle $\theta_m$ and the critical angle $\theta_c$, originates from intermediate image IIM1 formed at the intermediate image plane IMP1, and exits through the transparent region 710 of the image-side surface 702b of the solid lens 702. Specifically, the rays L4 of Group I coming from the IMP1 pass through the transmissive region 730 of the object-side surface 702a and undergo TIR upon impinging on the transparent region 710 of the image-side surface 702b. The reflected rays L4' travel back towards the object-side surface 702a, and are reflected by the reflective region 720 of the object-side surface 702a towards the image-side surface 702b. After undergoing at least two reflections within the solid lens 702, the rays L4' of Group I are refracted by the transparent region 710 of the image-side surface 702b, to subsequently exit outside of the solid lens 702, and advance to the third catadioptric group 800. In other words, light rays having an incident angle $\theta_i$ between rays having a marginal angle $\theta_m$ and the critical angle $\theta_c$ undergo multiple reflections within the solid lens 702 and exit therefrom substantially parallel to the optical axis AX.

The optical path of Group II, light rays L1 to L3 having an incidence angle between $\theta_c$ and $\theta_l$ also originates at IMP1 and exits through the transparent region 710 of the image-side surface 702b of the solid lens 702. Specifically, the rays L1 to L3 of Group II coming from the intermediate image plane (IMP1) pass through the transmissive region 730 of the object-side surface 702a and are specularly reflected by the ring-shaped light reflecting region 750 of the image-side surface 702b. Upon being specularly reflected as light rays L1' to L3', these rays L1' to L3' are now reflected by the reflective region 720 of the object-side surface 702a. From the reflective region 720, light rays L1' to L3' advance towards the image-side surface 702b, and are refracted by the transparent region 710 to subsequently exit outside of the solid lens 702 and advance towards the third catadioptric group 800. Therefore, light rays having an incident angle $\theta_i$ between $\theta_c$ and $\theta_l$ also undergo multiple reflections within the solid lens 702 and exit therefrom substantially parallel to the optical axis AX.

The optical path of Group III, rays L0 having an incidence angle between $\theta_l$ and 0, also originates at the IMP1, but this optical path does not exit through the image-side surface 702b of the solid lens 702. Instead, the rays L0 of group III are blocked by the circular non-transmissive region 730 of the image-side surface 702b.

Figure 13:
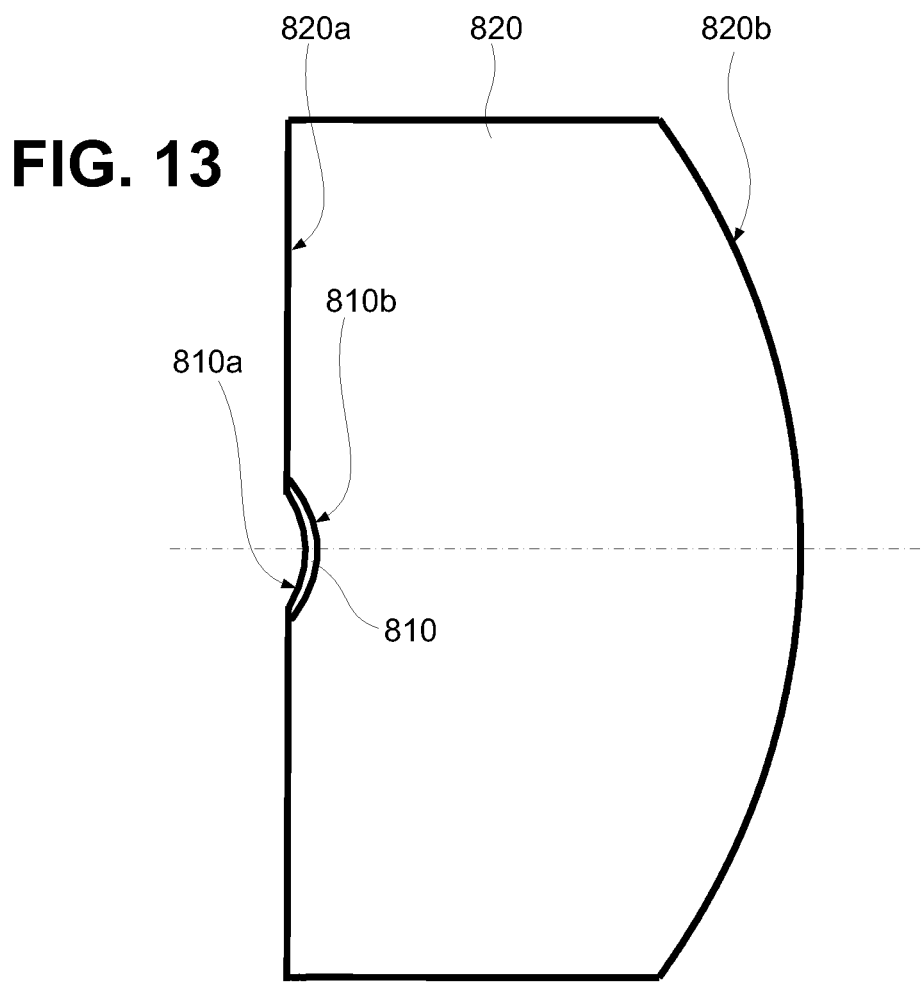
FIG. 13 illustrates a conceptual structure of a third catadioptric group illustrated in FIG. 10.

FIG. 13 illustrates in greater detail the conceptual structure and function of the third catadioptric group 800. As already mentioned above, the catadioptric group 800 includes a small lens 810 and a large lens 820. In turn, the small lens 810 includes an object-side surface 810a and an image-side surface 810b. The object-side surface 810a is preferably a convex reflective surface configured to specularly reflect light towards the image plane. The large lens 820 includes a substantially flat object-side surface 820a and a curved image-side surface 820b. The curved image-side surface 820b is a concave specularly reflective mirror, and the flat object-side surface 820a is a transparent surface preferably devoid of reflective films or coatings. Accordingly, in the third catadioptric group 800 the curved image-side surface 820b effectively functions as a reflective primary-surface, and the object-side surface 810a functions as a reflective secondary surface. In the present embodiment, the small lens 810 may be implemented as a cemented lens attached to the large lens 820. Catadioptric parameters in terms of radius of curvature for the reflective object-side surface 810a and image-side surface 820b, as well as distances therebetween, may be proportionally equivalent to a Schwarzschild objective system. In Schwarzschild system, if the two spherical mirrors are concentric to each other and separated by twice the system's focal length, the third-order spherical aberration, coma and astigmatism are substantially eliminated, provided the aperture stop is located at the common center of curvature of the two mirrors.

Referring back to FIG. 10, it should be noted that after the light rays of Groups I and II (shown in FIG. 12A) transmit through the image-side surface 702b of the solid lens 702, these rays advance onto the third catadioptric group 800 with minimal chromatic aberration. Specifically, after being reflected by the reflective region 720 of the object-side surface 702a and refracted by the transparent region 710 of the image-side surface 702b, the light rays of Groups I and II enter the large lens 820 through its object-side surface 820a. When light having passed through the solid lens 702 enters the object-side surface 820a of the large lens 820, monochromatic aberrations are substantially suppressed because the shape of the image-side surface 702b and that of object-side surface 820a is effectively the same. In other words, both image-side surface 702b and object-side surface 820a are flat and substantially parallel to each other, but with a minor gap therebetween. The gap between the two surfaces may be in the order of a few hundred microns, but it helps ensure TIR of light rays in Group I (see FIGS. 12A and 12B). However, for purposes of aberration, any difference in the height between the two surfaces may be considered negligible. Then, after the light rays of Groups I and II transmit through the object-side surface 820a of the large lens 820, these rays are converged by the reflective image-side surface 820b (concave mirror), and subsequently reflected by the object-side surface 810a (convex mirror) of the small lens 810, as shown in FIG. 10. The light exits the third catadioptric group 800 through the central transmissive region on the image-side surface 820b of the large lens 820. Then, the final image is formed at the image plane IP, by the lens group 900.

A primary role of the small lens 810 is to correct axial chromatic aberration. As it can be appreciated from Table 2 below, a significant amount of axial chromatic aberration (26.47) is generated by the catadioptric group 700 (solid lens 702), and more specifically by the image-side surface 702b. However, this chromatic aberration can be balanced out almost completely by the object-side surface 820a of the large lens 820. In other words, the object-side surface 820a introduces the same amount and the opposite sign of aberration as produced by the solid lens 702, which means −26.47. For this reason, axial chromatic aberration up to object-side surface 820a represents no issue in terms of aberration. However, when light passes through the transparent region of the image-side surface 820b, axial chromatic aberration (of −0.36) is generated. The lens group 900 cannot, at the same time, compensate for the amount of chromatic aberration generated in the transparent region of the image-side surface 820b, and the other aberration generated within the lens group itself. In order to solve this issue, the small lens 810 is placed on the object-side of the large lens 820 to act as a curved mirror because this position can mainly affect axial color not the other aberration so that the small lens 810 generates axial color of 0.2 and total of axial color from 810 to 820b is −0.16. Then −0.16 is comparable amount from lens group 900 and the other aberration is canceled within lens group 900. Experimental designs have been made, where the small lens 810 is not used, but this produces large axial chromatic aberration, which cannot be corrected with lens group 900 alone.

In operation, therefore, the multi-reflection optical element 102 of the first catadioptric group 100 collects light from an object scene (object O located at object plane OP) and forms the intermediate image IIM1 at the intermediate IMP1, in the same manner as described above in reference to FIG. 1. Light from the intermediate IMP1 passes through the second catadioptric group 700 and advances to the third catadioptric group 800 with minimal chromatic aberration. The light flux from the third catadioptric group 800 is magnified and focused onto the image plane (IP) to form a final image (FIM).

The role of each optical group in the embodiment of FIG. 10 is now discussed in terms of correction of Petzval curvature and TIR. By virtue of the first catadioptric group 100, NA larger than 1 can be achieved when the object space is immersed in an immersion fluid. In a case that the optical element 102 has an index of refraction substantially matching the refractive index of the immersion liquid, TIR does not occur when light enters the optical element 102 even at large incidence angles. In addition, since the surfaces of the optical element 102 can be designed so that light undergoes 4 or more reflections within the optical element, chromatic aberration is minimized. The concave shape of the image-side surface 102b generates outward Petzval curvature without generating large amount of astigmatism because the multi reflections are produced by an axisymmetric curved surface with a continuous and smooth topological profile (gentle surface). By virtue of the catadioptric group 700, the curved reflective region 720 of the object-side surface 702a intentionally generates outward Petzval curvature. Light rays incident on the transparent region 710 of the flat image-side surface 702b at an angle $\theta_i$ lower than a marginal angle $\theta_m$ and greater than the critical angle $\theta_c$ undergo total internal reflection to advantageously minimize the degree of obscuration without degrading image quality. The third group generates inward Petzval curvature as a whole, and this compensates for the outward Petzval curvature of the first and the second group. Fourth group creates outward Petzval curvature.

TABLE 2

Summary of optical power and aberration characteristics of catadioptric system 30 illustrated in FIG. 10. In Table 2, exemplary values calculated based on expressions (10), (11) and (12) are provided in parenthesis.

|  | CAT Group 100 | CAT Group 700 | LG Group 800 | DIO Group 900 |
|---|---|---|---|---|
| Optical Power | Positive (0.0057) | Positive (0.013) | Positive (0.026) | Positive (0.023) |
| Petzval Curvature | Outward (0.013) | Outward (0.0041) | Inward (−0.019) | Outward (0.0014) |
| Axial Chromatic Aberration | None (0) | Overcorrected (26.47) | Undercorrected (−26.63) | Overcorrected (0.18) |

Figure 14:
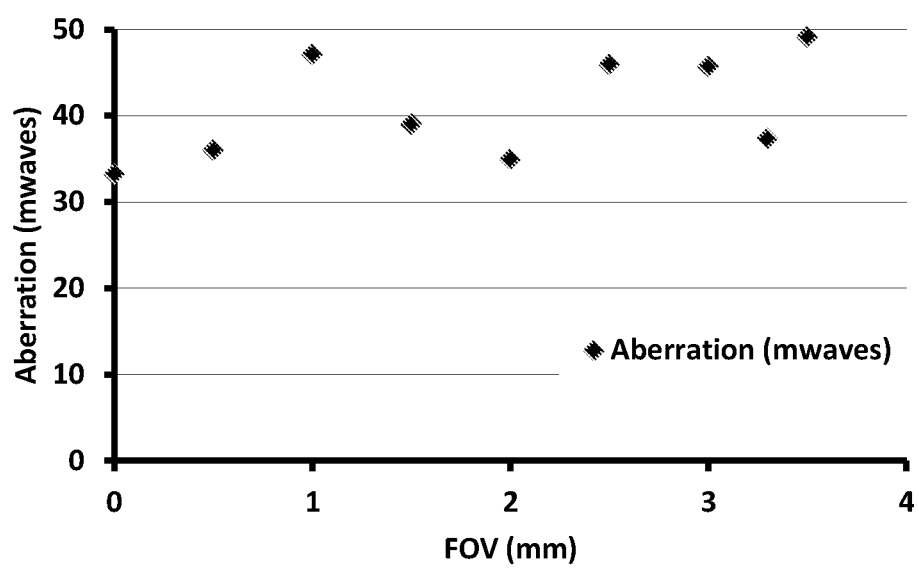
FIG. 14 is a graphical plot of RMS wavefront error across the field of view of a catadioptric system having a single intermediate image, in accordance with the embodiment shown in FIG. 10.

FIG. 14 is a graphical plot of RMS wavefront error across the field of view of a catadioptric system 30 having a first catadioptric group 100 consisting of a first optical element 102, a second catadioptric group 700 consisting of a second solid lens 702, a third catadioptric group 800 consisting of a small lens 810 and a large lens 820 cemented together, and a field lens group 900 including four lenses, in accordance with the embodiment shown in FIG. 10. Notably, with the arrangement of the present embodiment (FIG. 10), a compact optical system with fewer optical elements (as compared to FIG. 1 or 6) can be achieved. Nevertheless, the field of view and wavefront aberration in FIG. 14 is substantially similar to that shown in FIG. 9A. This shows that combining the multi-reflection optical element 102 with the solid lens 702 to introduce the light flux onto catadioptric group 800 and lens group 900 can advantageously reduce the number of optical elements necessary to assemble a compact catadioptric optical system while achieving and maintaining a large field of view, low obscuration ratio, and minimized aberrations.

In terms of the structure and function, it can be summarized that the multi-reflection optical element can be manufactured with at least one curved surface having a continuous and smooth topological profile to facilitate ease of production without requiring high-precision. And a variety of optical arrangements (e.g., FIG. 1, 6 or 10) can be adopted to efficiently control and minimize chromatic, spherical aberrations and obscuration.

Figure 15:
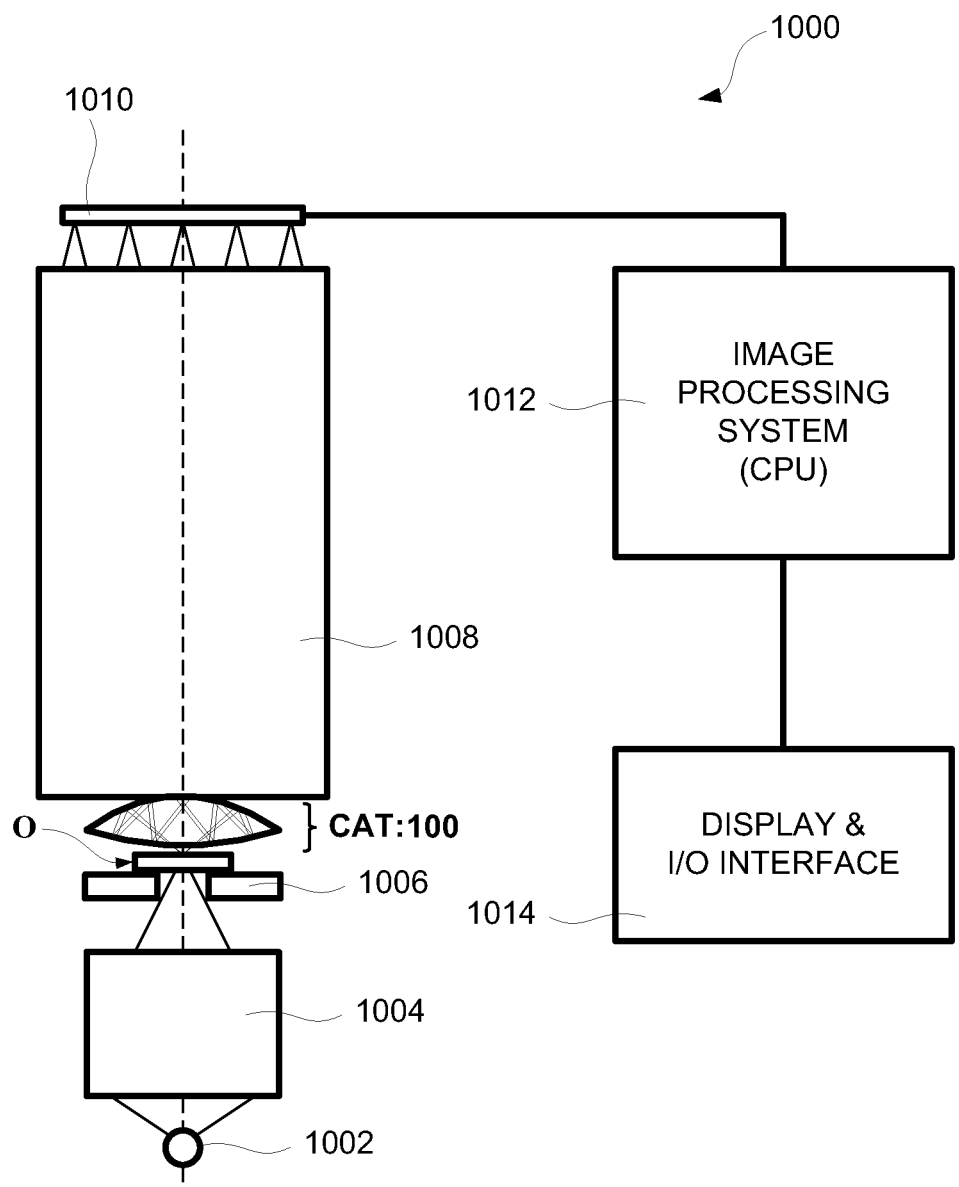
FIG. 15 illustrates an image pickup apparatus equipped with a catadioptric system using a multi-reflection optical element, according to an exemplary embodiment of the present invention.

FIG. 15 illustrates an image pickup apparatus 1000 equipped with a catadioptric system using a catadioptric group CAT 100 and an optical system 1008, according to an exemplary embodiment of the present invention. The catadioptric group CAT 100 collects a light flux from an object scene (an object O disposed at an object plane OP) to form an intermediate image IM of the object, at an intermediate image plane LIMP. The catadioptric group CAT 100 consists of a single solid lens having at least one curved surface with a continuous and smooth topographic profile. Advantageously the catadioptric group CAT 100 causes the light flux to undergo more than two reflections within its surfaces, before the light flux forms the intermediate image. The optical system 1008 is disposed at a position where the intermediate image IM is formed, so as to magnify and project the intermediate image IM onto an image plane IP. Any one of the above-described catadioptric system (FIG. 1), catadioptric system 20 (FIG. 6), or catadioptric system 30 (FIG. 10) can be adopted to implement the optical system 1008.

In this manner, the catadioptric system is configured to focus the intermediate image IM on the image plane IP, where an image sensor 1010 is located. The image pickup apparatus 1000 also includes a light source unit 1002, and an illumination optical system 1004 which illuminates the object O with a light flux from the light source unit 1002. An object stage 1006 may be configured to hold the object O at an object plane OP; the object stage may also be configured to function as a pupil that regulates the amount of light flux illuminating the object O. In the image pickup apparatus 1000, the image sensor 1010 is configured to photo-electrically convert the object image focused by the catadioptric system, so as to provide an image signal (data) to an image processing system 1012 which generates image information from data of the image sensor 1010. A display and input/output (I/O) unit 1014 serves to display and manipulate the image generated by the image processing system 1012.

NUMERICAL EXAMPLES

Data corresponding to the following numerical examples 1 and 2 are representative of the catadioptric optical system 10 illustrated in FIG. 1 and the catadioptric optical system 20 illustrated in FIG. 6. In the numerical examples presented herein, the reference indicia "i" (where i=1, 2, 3 . . . ) denotes the order of surfaces in the optical system from the object plane OP to the image plane IP. With this premise, the "Radius" data $R_i$ corresponds to an $i^{th}$ radius of curvature (at the $i^{th}$ plane); thickness $T_i$ denotes an on-axis distance (or space) between the ith and $(i+1)^{th}$ surface; the reference $nd_i$ and $vd_i$ respectively denote the index of refraction and Abbe number of the material of the $i^{th}$ optical element with respect to the Fraunhoffer d-line. A surface number without data for $nd_i$ and $vd_i$ indicates that this surface number represents an air space. A radius R=1.00E+18 (where 1E+X is equivalent to $1\times10^{+X}$) denotes a substantially infinite radius, i.e., a flat surface. In addition, in each numerical example, it is assumed that the object O is located on the object side of the first optical surface and at an object plane OP and substantially aligned on (or with) the optical axis AX; that is, the object O is assumed to be in axial alignment with the optical system. An aperture stop STO is assumed located at a relative far distance from object O so that the object space can be considered substantially telecentric. Specifically, in order to form an object-space telecentric system (i.e., a system that has the exit pupil effectively at infinity) an aperture stop STO is considered to be located at the front focal point of the system. Herein, when the exit pupil is located at a distance of at least 100000 mm away from the object plane OP it is said that the exit pupil is effectively at infinity. In the numerical example, the object O is considered to be immersed in a fluid with a refractive index matching the refractive index of the multi-reflection optical element. Where present, aspherical surfaces are denoted by an asterisk ("*") added next to the surface number.

In each aspheric surface, a conic constant is denoted by k (where k is a number that describes a conic surface, being zero for a sphere, −1 for a paraboloid, and with other values to describe any conic of revolution); aspherical polynomial order coefficients are denoted by A, B, C, D, E, F, G, J . . . which are $4^{th}$, $6^{th}$, $8^{th}$, $10^{th}$, $12^{th}$, $14^{th}$ and $16^{th}$ order coefficient respectively; and a displacement in the direction of the optical axis at a position of height h from the optical axis is denoted by z with reference to an apex of the surface. The displacement in the aspherical surface is based on expression (18) shown below. A summary of aspherical coefficients for Numerical Example 1 is tabulated in Table 4.

$$z = \frac{ch^2}{1 + \sqrt{1-(1+k)c^2h^2}} + Ah^4 + Bh^6 + Ch^8 + Dh^{10} + Eh^{12} + Fh^{14} + Gh^{16} + Hh^{18} + Jh^{20} + \ldots$$

Numerical Example 1

Data corresponding to numerical example 1 represents a catadioptric optical system comprising, in order from an object side to an image side, a first catadioptric group, a second catadioptric group and a field lens group and a dioptric group disposed in axial alignment with each other, as illustrated in FIG. 1. In the catadioptric optical system of Numerical Example 1, the first catadioptric group is configured to form, at a first intermediate image plane, a first intermediate image of an object disposed at an object plane; and the second catadioptric group and the field lens group are configured to together form, at a second intermediate image plane, a second intermediate image based on the first intermediate image. A dioptric group is configured to magnify the second intermediate image and to form, at an image plane, a final image of the object based on the second intermediate image.

TABLE 3

Optical element data for Numerical Example 1

| Surface | R | T | nd | vd |
|---|---|---|---|---|
| 1 | 1.00E+18 | 1.989 | 1.773 | 49.56 |
| 2* | 1887.465 | 72.341 | 1.773 | 49.56 |
| 3* | −233.613 | −72.341 | 1.773 | 49.56 |
| 4* | 1887.465 | 72.341 | 1.773 | 49.56 |
| 5* | −233.613 | −72.341 | 1.773 | 49.56 |
| 6* | 1887.465 | 72.341 | 1.773 | 49.56 |
| 7* | −233.613 | 5.723 | 1.773 | 49.56 |
| 8* | −188.629 | 31.520 | 1.773 | 49.56 |
| 9* | −105.966 | 71.976 | | |
| 10 | −101.579 | 8.612 | 1.773 | 49.56 |
| 11 | −121.851 | −8.612 | 1.773 | 49.56 |
| 12* | −101.579 | −71.976 | | |
| 13 | −105.966 | −31.520 | 1.773 | 49.56 |
| 14 | −188.629 | 31.520 | 1.773 | 49.56 |
| 15* | −105.966 | 71.976 | | |
| 16 | −101.579 | 8.612 | 1.773 | 49.56 |
| 17 | −121.851 | 0.887 | | |
| 18* | 102.350 | 6.749 | 1.711 | 47.66 |
| 19* | −237.390 | 8.675 | | |
| 20 | 122.240 | 3.000 | 1.594 | 39.45 |
| 21 | 26.038 | 10.798 | 1.639 | 56.88 |
| 22 | −148.302 | 16.651 | | |
| 23* | 121.417 | 5.177 | 1.751 | 32.47 |
| 24* | −99.792 | 11.694 | | |
| 25 | 51.691 | 13.396 | 1.681 | 50.90 |
| 26* | −67.244 | 6.833 | | |
| 27 | −29.804 | 3.000 | 1.755 | 27.58 |
| 28 | 119.986 | 2.774 | | |
| 29 | −1859.602 | 15.506 | 1.746 | 41.22 |
| 30 | −52.904 | 0.500 | | |
| 31* | −216.043 | 10.085 | 1.744 | 44.85 |
| 32 | −60.284 | 0.500 | | |
| 33* | 50.695 | 30.815 | 1.751 | 32.24 |
| 34 | 38.459 | 11.295 | | |
| 35 | 72.752 | 23.683 | 1.755 | 27.58 |
| 36 | 302.321 | 8.281 | | |
| 37 | −35.308 | 3.000 | 1.708 | 29.80 |
| 38* | 119.735 | 13.460 | | |
| 39 | −30.383 | 47.014 | 1.635 | 57.55 |
| 40* | −56.792 | 23.576 | | |
| 43 | 507.808 | 20.490 | 1.709 | 47.90 |
| 44 | −476.546 | 9.999 | | |
| IM | 1.00E+18 | 0 | | |

TABLE 4

Aspherical coefficients for Numerical Example 1

| Surface | k | A | B | C | D | E | F | G |
|---|---|---|---|---|---|---|---|---|
| 4, 6, 8 | 0.00E+00 | −2.03E−09 | −1.28E−13 | −2.47E−18 | −1.48E−22 | 1.39E−27 | −5.56E−31 | 0.00E+00 |
| 3, 5, 7 | 0.00E+00 | −2.04E−08 | −1.63E−13 | 4.17E−18 | −9.05E−22 | 2.79E−27 | 1.24E−31 | 0.00E+00 |
| 9, 1 5 | 0.00E+00 | −1.31E−07 | −3.34E−12 | 9.37E−17 | 6.93E−20 | −9.10E−24 | 3.08E−28 | 0.00E+00 |
| 12, 18 | 0.00E+00 | −1.60E−10 | −1.35E−14 | −3.83E−19 | −2.65E−23 | 6.78E−28 | −2.64E−31 | 0.00E+00 |
| 19 | 0.00E+00 | −2.11E−06 | 2.68E−10 | 4.10E−14 | −2.63E−17 | −4.33E−31 | 2.21E−24 | 0.00E+00 |
| 23 | 0.00E+00 | 9.75E−07 | −4.30E−10 | 7.28E−13 | −2.84E−16 | −1.91E−35 | −7.44E−32 | 0.00E+00 |
| 24 | 0.00E+00 | −4.49E−06 | 2.02E−10 | −3.67E−13 | −1.51E−16 | 1.55E−31 | 6.73E−36 | 0.00E+00 |
| 26 | 0.00E+00 | 3.21E−06 | −8.09E−10 | −1.83E−12 | −3.16E−16 | −1.97E−36 | 4.35E−32 | 0.00E+00 |
| 31 | 0.00E+00 | 1.97E−06 | 5.55E−10 | 2.50E−13 | −2.45E−16 | −3.28E−33 | −1.42E−29 | 0.00E+00 |
| 33 | 0.00E+00 | −8.71E−07 | −1.46E−10 | −1.97E−13 | 1.26E−17 | −1.52E−32 | −3.91E−23 | 0.00E+00 |
| 38 | 0.00E+00 | −1.99E−06 | 2.64E−09 | 9.91E−13 | −1.55E−15 | −5.16E−20 | 1.75E−32 | 0.00E+00 |
| 40 | 0.00E+00 | 2.75E−06 | 2.03E−10 | −1.78E−13 | 4.55E−16 | −3.10E−19 | 1.85E−32 | 0.00E+00 |
| 44 | 0.00E+00 | −2.52E−07 | −2.69E−11 | 7.10E−15 | 3.03E−20 | −1.28E−22 | 9.46E−27 | 0.00E+00 |

Numerical Example 2

Data corresponding to numerical example 2 represents a catadioptric optical system comprising, in order from an object side to an image side, a first catadioptric group, a second catadioptric group, and a field lens group disposed in axial alignment with each other, as illustrated in FIG. 6. The first catadioptric group is configured to form, at a first intermediate image plane, a first intermediate image of an object disposed at an object plane. And the second catadioptric group and the lens group are configured to together form, at an image plane, a final image of the object based on the first intermediate image.

TABLE 5

Optical element data for Numerical Example 2

| Surface | R | T | nd | vd |
|---|---|---|---|---|
| 1 | 1.00E+18 | 0.250 | 1.773 | 49.57 |
| 2* | 294.781 | 14.999 | 1.773 | 49.57 |
| 3* | −105.885 | −14.999 | 1.773 | 49.57 |
| 4* | 294.781 | 14.999 | 1.773 | 49.57 |
| 5* | −105.885 | −14.999 | 1.773 | 49.57 |
| 6* | 294.781 | 14.999 | 1.773 | 49.57 |
| 7* | −105.885 | −14.999 | 1.773 | 49.57 |
| 8* | 294.781 | 14.999 | 1.773 | 49.57 |
| 9* | −105.885 | 1.563 | 1.773 | 49.57 |
| 10* | −19.509 | 36.608 | 1.773 | 49.57 |
| 11* | −41.203 | −36.608 | 1.773 | 49.57 |
| 12* | −19.509 | 36.608 | 1.773 | 49.57 |
| 13* | −41.203 | 0.000 | 1.773 | 49.57 |
| 14* | −170.975 | 1.988 | | |
| 15* | −80.711 | 3.744 | 1.621 | 35.88 |
| 16* | 51.028 | 0.618 | | |
| 17* | 52.107 | 13.899 | 1.620 | 60.27 |
| 18* | 1751.083 | 0.572 | | |
| 19* | 39.674 | 5.858 | 1.785 | 25.71 |
| 20* | −77.484 | 3.406 | | |
| 21 | −33.147 | 3.750 | 1.915 | 21.17 |
| 22 | −226.941 | 1.278 | | |
| 23 | −210.094 | 3.750 | 1.603 | 38.01 |
| 24 | 93.276 | 3.266 | | |
| 25 | −74.120 | 3.750 | 1.670 | 47.11 |
| 26 | −26.361 | −0.009 | | |
| 27 | −52.154 | 3.772 | 1.772 | 49.60 |
| 28 | 58.142 | 5.113 | | |
| 29* | −52.109 | 11.071 | 1.847 | 23.77 |
| 30* | −48.868 | 0.000 | | |
| 31* | −138.672 | 3.927 | 1.804 | 39.59 |
| 32* | −99.069 | 2.965 | | |
| 33* | 112.601 | 7.085 | 1.516 | 64.07 |
| 34* | −60.451 | 0.000 | | |
| 35* | 34.980 | 7.183 | 1.757 | 47.82 |
| 36 | 1.00E+18 | 2.500 | | |
| IM | 1.00E+18 | 0 | | |

TABLE 6

Aspherical coefficients for Numerical Example 2

| Surface | k | A | B | C | D | E | F | G |
|---|---|---|---|---|---|---|---|---|
| 2, 4, 6, 8 | 0.00E+00 | −5.68E−07 | 2.34E−12 | 2.04E−14 | 7.13E−19 | 6.58E−21 | 7.15E−24 | −1.87E−27 |
| 3, 5, 7, 9 | 0.00E+00 | −4.90E−08 | 4.68E−12 | −1.05E−15 | 9.86E−18 | 1.59E−21 | 7.70E−26 | 2.55E−27 |
| 10, 12 | 1.96E+00 | −8.07E−06 | −8.17E−08 | 1.22E−09 | −1.76E−10 | 6.05E−12 | −9.97E−14 | 5.86E−16 |
| 11, 13 | 7.78E−02 | 3.68E−08 | −3.26E−11 | 1.21E−13 | −2.16E−16 | 2.21E−19 | −1.28E−22 | 3.33E−26 |
| 14 | 0.00E+00 | 6.13E−05 | 2.30E−07 | 6.26E−10 | −4.08E−12 | 9.19E−14 | −5.30E−15 | 3.08E−17 |
| 15 | 0.00E+00 | 4.22E−05 | 6.38E−08 | −3.74E−10 | −8.52E−12 | −1.05E−13 | −9.81E−16 | 2.98E−18 |
| 16 | 0.00E+00 | −3.73E−05 | −9.17E−08 | −6.36E−10 | 1.75E−12 | −2.27E−14 | −1.92E−16 | 1.92E−19 |
| 17 | 0.00E+00 | −1.06E−05 | 5.63E−08 | 1.41E−10 | −2.31E−13 | 1.14E−15 | −7.95E−17 | −3.93E−19 |
| 18 | 0.00E+00 | −1.07E−05 | 1.99E−08 | −9.38E−11 | 1.66E−13 | −2.48E−15 | −4.27E−17 | 5.27E−20 |
| 19 | 0.00E+00 | −2.30E−05 | −3.14E−08 | −7.57E−11 | −2.61E−13 | 2.70E−15 | 1.91E−17 | −5.13E−20 |
| 20 | 0.00E+00 | −1.24E−05 | −1.21E−08 | 1.54E−11 | 5.76E−13 | 2.46E−15 | 8.18E−18 | 6.85E−20 |
| 29 | 0.00E+00 | 8.15E−07 | −4.30E−10 | 1.92E−12 | 7.77E−15 | 7.66E−18 | −9.00E−20 | −5.60E−22 |
| 30 | 0.00E+00 | −7.26E−07 | −1.36E−09 | −2.47E−12 | −4.39E−15 | −7.15E−18 | −9.64E−21 | −1.80E−23 |
| 31 | 0.00E+00 | 1.59E−06 | −2.08E−09 | 4.31E−12 | 7.91E−15 | 4.78E−17 | −5.89E−20 | −6.82E−24 |
| 32 | 0.00E+00 | 2.76E−07 | 7.11E−10 | 1.26E−12 | 2.43E−15 | 4.75E−18 | 8.96E−21 | 9.08E−24 |
| 33 | 0.00E+00 | −2.50E−07 | 6.47E−12 | 5.32E−13 | 8.80E−16 | 5.27E−19 | −3.88E−22 | 2.32E−24 |

TABLE 6-continued

Aspherical coefficients for Numerical Example 2

| Surface | k | A | B | C | D | E | F | G |
|---|---|---|---|---|---|---|---|---|
| 34 | 0.00E+00 | −4.95E−06 | 5.22E−09 | 3.21E−12 | 7.90E−15 | −3.59E−17 | 8.52E−20 | −7.66E−23 |
| 35 | 0.00E+00 | 1.14E−06 | −1.41E−08 | 6.44E−11 | −1.42E−13 | 8.81E−17 | 3.27E−19 | −5.44E−22 |

Numerical Example 3

Data corresponding to numerical example 3 represents a catadioptric optical system comprising, in order from an object side to an image side, a first catadioptric group, a second catadioptric group, a third catadioptric group, and a field lens group disposed in axial alignment with each other, as illustrated in FIG. 10. The first catadioptric group is configured to form, at a first intermediate image plane, a first intermediate image of an object disposed at an object plane. The second catadioptric group consists of a solid lens having curved image-side surface and a substantially flat image-side surface. The flat image-side surface includes a central non-transmissive (obscured) region centered on the optical axis, a ring-shaped reflective region and a transparent (transmissive) region. The second catadioptric group and the lens group are configured to together form, at an image plane, a final image of the object based on the first intermediate image.

TABLE 7

Data for Numerical Example 3

| Surface | R | T | nd | vd |
|---|---|---|---|---|
| 1 | 1.00E+18 | 1.000 | 1.773 | 49.57 |
| 2 | 428.6687 | 65.367 | 1.773 | 49.57 |
| 3 | −276.436 | −65.367 | 1.773 | 49.57 |
| 4 | 428.6687 | 65.367 | 1.773 | 49.57 |
| 5 | −276.436 | −65.367 | 1.773 | 49.57 |
| 6 | 428.6687 | 65.367 | 1.773 | 49.57 |
| 7 | −276.436 | 0.500 | 1.773 | 49.57 |
| 8 | 274.4681 | 35.603 | 1.773 | 49.57 |
| 9 | 1.00E+18 | −35.603 | 1.773 | 49.57 |
| 10 | 274.4681 | 35.603 | 1.773 | 49.57 |
| 11 | 1.00E+18 | 0.050 | | |
| 12 | 1.00E+18 | 4.470 | 1.773 | 49.57 |
| 13 | 1.00E+18 | 3.000 | 1.773 | 49.57 |
| 14 | 1.00E+18 | 206.125 | 1.773 | 49.57 |
| 15 | −301.387 | −206.125 | 1.773 | 49.57 |
| 16 | −41.3272 | −3.000 | 1.741 | 52.64 |
| 17 | −52.386 | 3.000 | 1.741 | 52.64 |
| 18 | −41.3272 | 206.125 | 1.773 | 49.57 |
| 19 | −301.387 | 14.526 | | |
| 20 | −56.6917 | 3.000 | 1.487 | 70.21 |
| 21 | −286.144 | 1.936 | | |
| 22 | −222.051 | 21.936 | 1.497 | 81.61 |
| 23 | 107.6465 | 36.418 | 1.640 | 60.08 |
| 24 | −449.23 | 0.500 | | |
| 25 | 438.2098 | 15.570 | 1.788 | 47.37 |
| 26 | −188.877 | 10.000 | | |
| IM | 1.00E+18 | 0.000 | | |

While the various aspects of the present invention have been described with reference to exemplary embodiments, it is to be understood that the present invention is not limited to the above described embodiments. The scope of the following claims is to be accorded the broadest interpretation so as to encompass all modifications and equivalent structures and functions.

What is claimed is:

1. A catadioptric optical system comprising:
a first catadioptric group configured to form an intermediate image of an object; and
a second catadioptric group and a lens group configured to form an object image based on the intermediate image,
wherein the first catadioptric group consists of a solid lens having an object-side surface and an image-side surface,
wherein the object-side surface includes an input surface provided around an optical axis and an object-side reflective surface provided around the input surface;
wherein the image-side surface includes an exit surface provided around the optical axis and an image-side reflective surface provided around the exit surface;
wherein a light flux from the object enters the solid lens through the input surface, and undergoes four or more reflections between the image-side reflective surface and the object-side reflective surface, prior to exiting through the exit surface; and
wherein:
the lens group includes a field lens group and a dioptric group,
the first catadioptric group has a positive refractive power and generates outward Petzval curvature,
the second catadioptric group has positive refractive power and generates outward Petzval curvature and overcorrected axial chromatic aberration,
the field lens group has positive refractive power and generates inward Petzval curvature and overcorrected axial chromatic aberration, and
the dioptric group has positive refractive power and generates outward Petzval curvature and undercorrected axial chromatic aberration.

* * * * *

TABLE 8

Aspherical coefficients for Numerical Example 3

| Surface | k | A | B | C | D | E | F | G |
|---|---|---|---|---|---|---|---|---|
| 2, 4, 6 | 0.00E+00 | −3.11E−08 | −2.33E−14 | −3.94E−17 | 9.48E−22 | −4.16E−26 | 1.68E−30 | −9.21E−35 |
| 3, 5, 7 | 0.00E+00 | 8.26E−09 | −1.14E−12 | 3.23E−17 | −1.81E−21 | 6.42E−27 | 1.25E−30 | −6.73E−35 |
| 8, 10 | −2.31E+00 | 5.87E−09 | −5.37E−13 | 1.18E−18 | 3.80E−21 | −2.81E−25 | 7.87E−30 | −4.53E−35 |
| 15, 19 | 0.00E+00 | −8.15E−10 | 1.75E−14 | 4.62E−19 | −1.04E−23 | 7.81E−28 | −2.19E−32 | 4.19E−37 |
| 17 | 0.00E+00 | −6.85E−07 | −5.92E−10 | −5.03E−14 | −8.41E−16 | 1.73E−19 | 2.18E−22 | 0.00E+00 |
| 20 | 0.00E+00 | 1.12E−06 | 5.74E−11 | 9.36E−14 | −7.85E−17 | 5.57E−20 | −1.87E−23 | 2.85E−27 |
| 26 | 0.00E+00 | 5.03E−07 | −1.73E−10 | 7.58E−14 | −2.23E−17 | 4.08E−21 | −4.16E−25 | 1.78E−29 |